United States Patent [19]

Sternberg et al.

[11] 4,395,698

[45] Jul. 26, 1983

[54] NEIGHBORHOOD TRANSFORMATION LOGIC CIRCUITRY FOR AN IMAGE ANALYZER SYSTEM

[75] Inventors: Stanley R. Sternberg; William O. Dargel; Robert M. Lougheed; David L. McCubbrey, all of Ann Arbor, Mich.; Ralph E. Richardson, Eatontown, N.J.

[73] Assignee: Environmental Research Institute of Michigan, Ann Arbor, Mich.

[21] Appl. No.: 178,312

[22] Filed: Aug. 15, 1980

[51] Int. Cl.³ .................. G06K 9/00; G06F 15/20
[52] U.S. Cl. ................................ 382/27; 364/768; 364/900; 377/70; 382/41; 382/49
[58] Field of Search ... 364/200 MS File, 900 MS File, 364/515, 711, 715, 736, 768; 340/146.3 MA, 146.3 H, 146.3 Y, 146.3 AC, 146.3 R, 146.3 J; 358/260, 261

[56] References Cited

U.S. PATENT DOCUMENTS

| | | | |
|---|---|---|---|
| 3,106,698 | 10/1963 | Unger | 364/200 |
| 3,106,699 | 10/1963 | Kamentsky | 340/146.3 H |
| 3,196,398 | 7/1965 | Baskin | 340/146.3 H |
| 3,214,574 | 10/1965 | Landsman et al. | 340/146.3 H |
| 3,287,703 | 11/1966 | Slotnick | 364/200 |
| 3,339,179 | 8/1967 | Shelton, Jr. et al. | 340/146.3 H |
| 3,573,789 | 4/1971 | Sharp et al. | 340/146.3 H |
| 3,702,986 | 11/1972 | Taylor et al. | 364/200 |
| 3,706,071 | 12/1972 | Gray | 340/146.3 MA |
| 3,849,760 | 11/1974 | Endou et al. | 340/146.3 H |
| 3,889,234 | 6/1975 | Makihara et al. | 340/146.3 MA |
| 3,889,771 | 8/1975 | Saraga et al. | 340/146.3 MA |
| 4,003,024 | 1/1977 | Riganati et al. | 340/146.3 MA |
| 4,060,713 | 11/1977 | Golay | 340/146.3 MA |
| 4,104,616 | 8/1978 | Issiki et al. | 340/146.3 J |
| 4,167,728 | 9/1979 | Sternberg | 340/146.3 MA |
| 4,174,514 | 11/1979 | Sternberg | 340/146.3 MA |
| 4,210,962 | 7/1980 | Marsh et al. | 364/900 |
| 4,290,049 | 9/1981 | Sternberg et al. | 340/146.3 MA |

FOREIGN PATENT DOCUMENTS 1437161 5/1976 United Kingdom ............... 364/900

OTHER PUBLICATIONS

"A Parallel Picture Processing Machine", Bjorn Kruse, IEEE Transactions On Computers, vol. C-22, No. 12, Dec. 1973.

*Primary Examiner*—Leo H. Boudreau
*Attorney, Agent, or Firm*—Krass, Young & Schivley

[57] ABSTRACT

An image analyzer system employs one or more neighborhood transformation stages. The stage operates to access groups of neighboring pixels in an image matrix, analyzes them and generates a transformation output as a result of the analysis. The stage includes a logic circuit which is programmable from a central controller. In the preferred embodiment, each pixel in the neighborhood is analyzed by the logic circuit and temporarily stored until other pixels in the group have been analyzed. The combination of analyzed pixel values form the basis for generating the transformation output for the stage. Preferably, the logic circuit is designed to perform both two dimensional and three dimensional image analyses.

22 Claims, 27 Drawing Figures

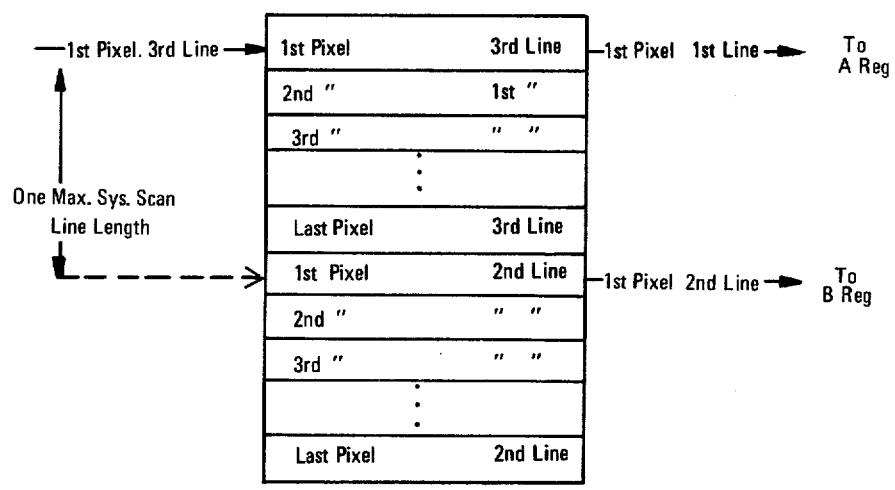

| TRUTH TABLE — MULTIPLEXER 94 ||||||
|---|---|---|---|---|---|
| SELECT || INPUTS || OUTPUTS ||
| OFF IMAGE | MAXMODE | F1 | F2 | OUTPUT NO. 100 | OUTPUT NO. 99 |
| 0 | 0 | 0 | 0 | ZERO DETECT | 0 |
| 0 | 0 | 0 | 1 | CARRY | 0 |
| 0 | 0 | 1 | 0 | ~ZERO DETECT $\wedge$ CARRY | 0 |
| 0 | 0 | 1 | 1 | MSB | 0 |
| 0 | 1 | X | X | A $\geq$ B | (A>B)$\wedge$~NBHR DISABLE |
| 1 | X | X | X | F$\emptyset$ | 0 |

*Fig-10A*

| TRUTH TABLE FOR OUTPUT GENERATION MULTIPLEXERS 56 |||||
|---|---|---|---|---|
| INPUTS |||| OUTPUT |
| OUTPUT BIT MASK REGISTER | OUTPUT CONTROL 1 | OUTPUT CONTROL 0 | NRAM OUTPUT | PRAM ADDRESS |
| 0 | X | X | X | Z |
| 1 | 0 | 0 | 0 | 0 |
| 1 | 0 | 0 | $\neq$ 0 | NRAM |
| 1 | 0 | 1 | 0 | Z |
| 1 | 0 | 1 | $\neq$ 0 | NRAM |
| 1 | 1 | 0 | 0 | MAX |
| 1 | 1 | 0 | $\neq$ 0 | NRAM |
| 1 | 1 | 1 | 0 | Z |
| 1 | 1 | 1 | $\neq$ 0 | MAX |

*Fig-10B*

| TRUTH TABLE FOR LINE SHIFT MUX 78 | | |
|---|---|---|
| LINE SHIFT | Cn INPUT | NSEL n OUTPUT |
| 0 | 0 | A |
| 0 | 1 | B |
| 0 | 2 | C |
| 0 | 3 | D |
| 0 | 4 | E |
| 0 | 5 | F |
| 0 | 6 | G |
| 0 | 7 | H |
| 0 | 8 | Z |
| 1 | 0 | H |
| 1 | 1 | B |
| 1 | 2 | D |
| 1 | 3 | E |
| 1 | 4 | E |
| 1 | 5 | F |
| 1 | 6 | G |
| 1 | 7 | G |
| 1 | 8 | Z |

Fig-10C

| TRUTH TABLE FOR MULTIPLEXER NO. 77 | | | | |
|---|---|---|---|---|
| SELECT INPUTS | | | | OUTPUT |
| NEIGHBOR DISABLE | PARMODE | OFF IMAGE | A>B | SELOUT |
| 0 | 0 | 0 | 0 | CURMAX |
| 0 | 0 | 0 | 1 | MODNBR |
| 0 | 0 | 1 | 0 | CURMAX |
| 0 | 0 | 1 | 1 | CURMAX |
| 0 | 1 | 0 | X | CURMAX V MODNBR |
| 0 | 1 | 1 | X | CURMAX V F $\phi$ |
| 1 | X | X | X | CURMAX |

Fig-10D

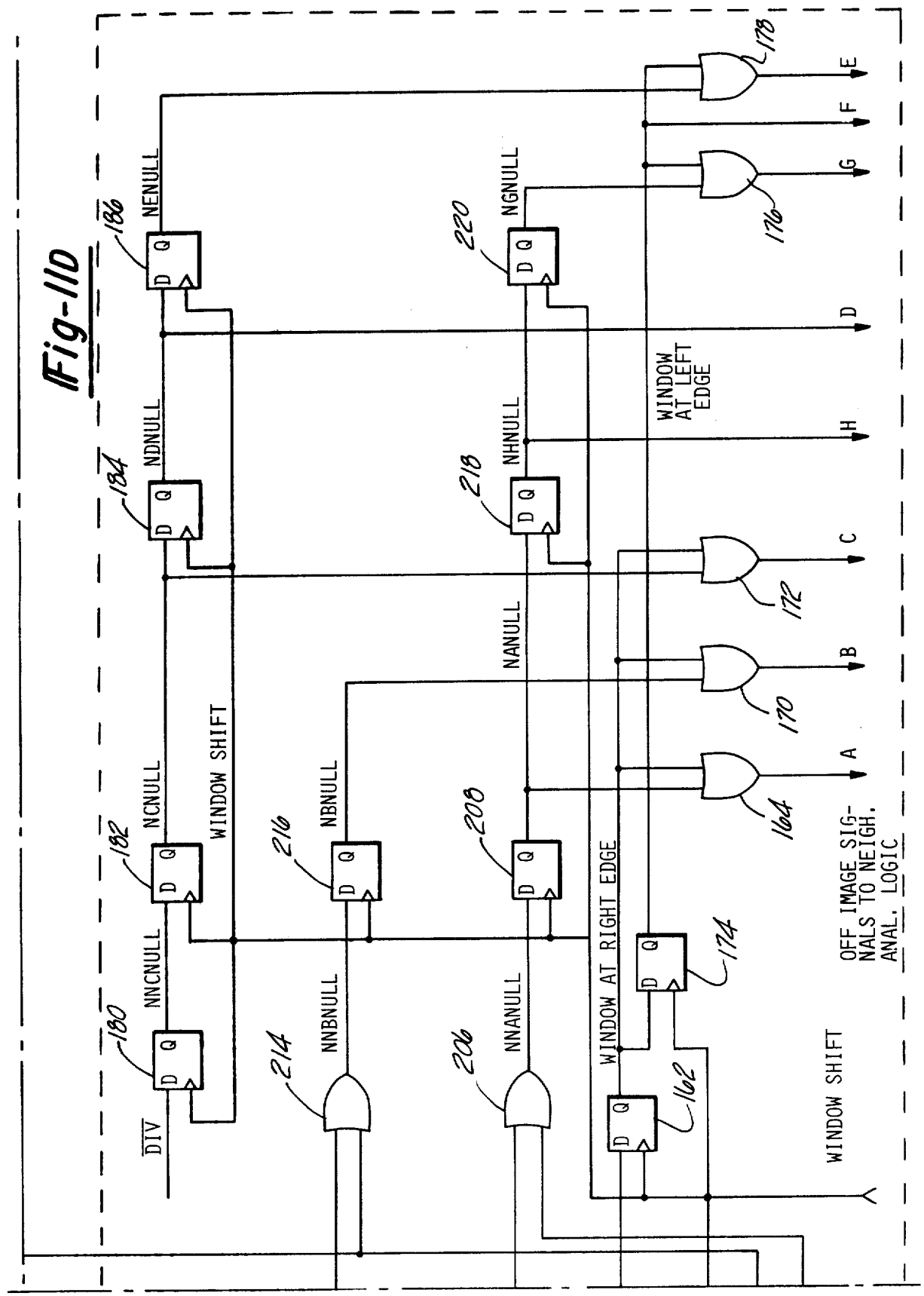

NEIGHBORHOOD TRANSFORMATION LOGIC CIRCUITRY FOR AN IMAGE ANALYZER SYSTEM

BACKGROUND OF THE INVENTION

This invention relates to image analyzer systems and, more particularly, to pattern recognition and analysis devices utilizing a series of neighborhood transformations.

A wide variety of applications exist in which it would be desirable for a machine to automatically recognize, analyze, and/or classify patterns existing in images which have been sensed and converted to some sort of matrix of electrical signals. Some of the simpler problems, which have been implemented with at least limited success by machines, include the recognition of alphanumeric characters and recognitional counting of certain particles, such as blood cells. (See, e.g. U.S. Pat. No. 3,846,754 to Oka; U.S. Pat. No. 3,196,398 to Baskin; U.S. Pat. No. 3,573,789 to Sharp; U.S. Pat. No. 3,761,876 to Flaherty; U.S. Pat. No. 3,287,703 to Slotnick; U.S. Pat. No. 3,899,771 to Saraga et al; U.S. Pat. No. 3,959,771 to Uno et al; and U.S. Pat. No. 4,110,736 to Kono.)

Elaborate programs have been written for general purpose computers to perform pattern analysis and classification. The limited success of the general purpose computer in performing pattern analysis and classification is due to the extremely long processing time to process images with very many data points or pixels. A more promising approach is the use of special purpose processors which implement a mathmatical technique applicable to data in the form of images, integral geometry being such a technique. One such approach considers the input data as an M by N array of zeroes and ones representing black or white picture elements. From the input array another M by N array is derived wherein each point in the second array is a function of the state of the equivalent point in the initial array. A series of these transforms may be performed to determine some of the characteristics of patterns displayed in the initial array. For example, U.S. Pat. No. 3,214,574 discloses a special purpose image processor used for counting lympocytes in blood. Devices employing similar forms of processors for implementing these so called "neighborhood transforms" are disclosed in *Pattern Detection and Recognition* by Unger, Proceedings of the I.R.E. 1959, page 737; *Feature Extraction* by Galay; *Hexogonal Pattern Transforms*, Preston, Jr., IEEE Transactions on Computers, Vol. C-20, No. 9, September 1971; and *A Parallel Picture Processing Machine* by Kruse, IEEE Transactions on Computers, Vol. C-22, No. 12, December 1973.

Another class of special purpose machines for implementing a form of integral geometry analysis employing what the author terms "hit-or-miss transformations" is disclosed in "The Texture Analyzer", Journal of Microscopy, Volume 95, Part II, April 1972, pages 349-356.

Many of these prior art image processors require that the data points in the image to be reduced to binary form, either zero or one, in accordance with the conventional requirements of integral geometry. For applications of integral geometry in pattern recognition see:

1. G. Matheron, *Random Sets and Integral Geometry*, Wiley, 1975.
2. Albert B. J. Novikoff, "Integral Geometry As A Tool In Pattern Reception", in *Principals of Self Organization*, edited by Von Foerstn and Zopf, Pergamon Press, 1962.
3. J. Sera, "Stereology and Structuring Elements", Journal of Microscopy, Vol. 95, Part 1, February 1972, pages 93-103.

A new class of image analyzer processors is disclosed in U.S. Pat. No. 4,167,728 to Sternberg, which is assigned to the assignee of the present invention. That patent discloses a serial chain of substantially identical neighborhood transformation modules. The image data, generally in the form of raster scan lines, is serially shifted through a neighborhood extraction portion in each stage for sequentially accessing substantially all of the neighborhoods in the image matrix. Depending upon the states of the pixels contained in the neighborhood extraction portion, certain transformations are performed and the transformed output is passed on to the input of the succeeding stage. A central controller, which is coupled to all of the stages, defines all of the particular transformation analyses to be performed in the stages.

U.S. Pat. No. 4,174,514 to Sternberg, also assigned to the assignee of the present invention, discloses a technique by which the image data is partitioned and fed through associated parallel processors making up each stage.

U.S. patent application Ser. No. 73,818 to Sternberg, filed Sept. 10, 1979, and assigned to the assignee of the present invention, discloses pattern recognition circuitry capable of analyzing three dimensional images represented by multi-valued pixel image data. The specific embodiment shown in that application utilizes two different pipelines of transformation stages, one for two-dimensional image analysis and one for three-dimensional image analysis. While the stages in each pipeline are substantially identical, the stages in one pipeline differ from those in the other pipeline. The stages in the two dimensional pipeline are specifically adapted to perform transformations generally associated with two-dimensional image data, while the stages in the three dimensional pipeline are particularly adapted for performing three dimensional data analysis. A central controller routes the image data to one or the other of the pipelines depending upon the type of analysis to be performed, with the central controller being parallel coupled to the control portions of each stage. The controller sends control instructions to the transformation logic to define the type of transformation to be generated in each stage of the selected pipeline.

The aforementioned commonly assigned patents and application are hereby incorporated by reference.

SUMMARY OF THE INVENTION

According to one aspect of the present invention, the neighborhood transformation stages have been designed so that they each may be readily incorporated on a single integrated circuit chip. Each stage includes a processor portion for analyzing the pixel values in the image and a memory portion communicating with the processor portion for sequentially providing a window of neighboring pixels to the processor for analysis. A central programmable controller communicates with the pipeline of stages over a single communication line which provides both the pixel values to the pipeline and transformation control instructions to the processor portions of the stages.

Programming of each stage is accomplished by way of coded command signals which are either of a local or global type. Global commands propagate down the pipeline to all of the stages. In contrast, local commands are utilized to program only selected stages. Each stage includes a decoder for decoding the commands and retaining indicia of that command and the operational state in which the command placed the stage. A signal relating to the current state of the stage is used as decisional information upon receipt of subsequent commands to determine the stage response thereto. Depending upon the current state of the stage, local commands may or may not be passed along to the next stage in the pipeline.

Preferably, the memory portion of each stage includes a random access memory for storing pixel values corresponding to a given number of raster scan lines of the image. Means are provided for sequentially loading the processor portion with selected pixel values from the memory to sequentially access substantially all of the neighborhoods in the image matrix. The RAM memory serves as a recirculating line storage device which may be readily adjusted to accommodate different raster scan line lengths.

Pursuant to another feature of this invention, each stage is capable of performing a wide variety of both two-dimensional and three-dimensional image analyses. Thus, the image analyzer system requires only a single pipeline since each stage can be individually programmed to perform either two-dimensional or three-dimensional image analyses. The preferred embodiment of the invention advantageously utilizes an adder means having one input coupled to neighborhood window registers containing a central pixel and its surrounding pixels in the image matrix. A contribution value is coupled to the other input of the adder device. Two-dimensional or three-dimensional image analyses may be performed depending upon the content of the contribution value. For example, by providing a contribution value equal to and opposite from the desired pixel value of interest in the neighborhood window, the output of the adder means will be zero for each pixel value having the value of interest. Alternatively, three-dimensional image analysis can readily be performed in the same stage by detecting the maximum value of the outputs of the adder means for each of the neighborhood windows. Provision is also made for detecting which pixels in the neighborhood window contain a maximum value. Similarly, selected bits in a shift register table provide indications of the location of the pixels having the desired value of interest in two-dimensional image analysis. Still further aspects of this invention include circuitry for detecting which pixels in the neighborhood window have a value greater than a given value. Furthermore, provision is made for detecting which pixel values within the window have values greater than the center pixel.

Unique off image detection circuitry is employed for altering the transformation process to accommodate non-uniform borders of the image matrix. The number of valid "on image" pixels in successive lines are stored and compared with the number of valid pixels in the current line. Transformation control means is operative for altering the transformation when the comparison detects that selected pixels in the neighborhood window do not contain valid data.

BRIEF DESCRIPTION OF THE DRAWINGS

These and other advantages of the present invention will become apparent upon reading the following specification and by reference to the drawings in which:

FIGS. 10(A-D) are truth tables for multiplexers used in the neighborhood analysis logic circuitry of FIG. 8;

DESCRIPTION OF THE PREFERRED EMBODIMENTS

Figure 1:
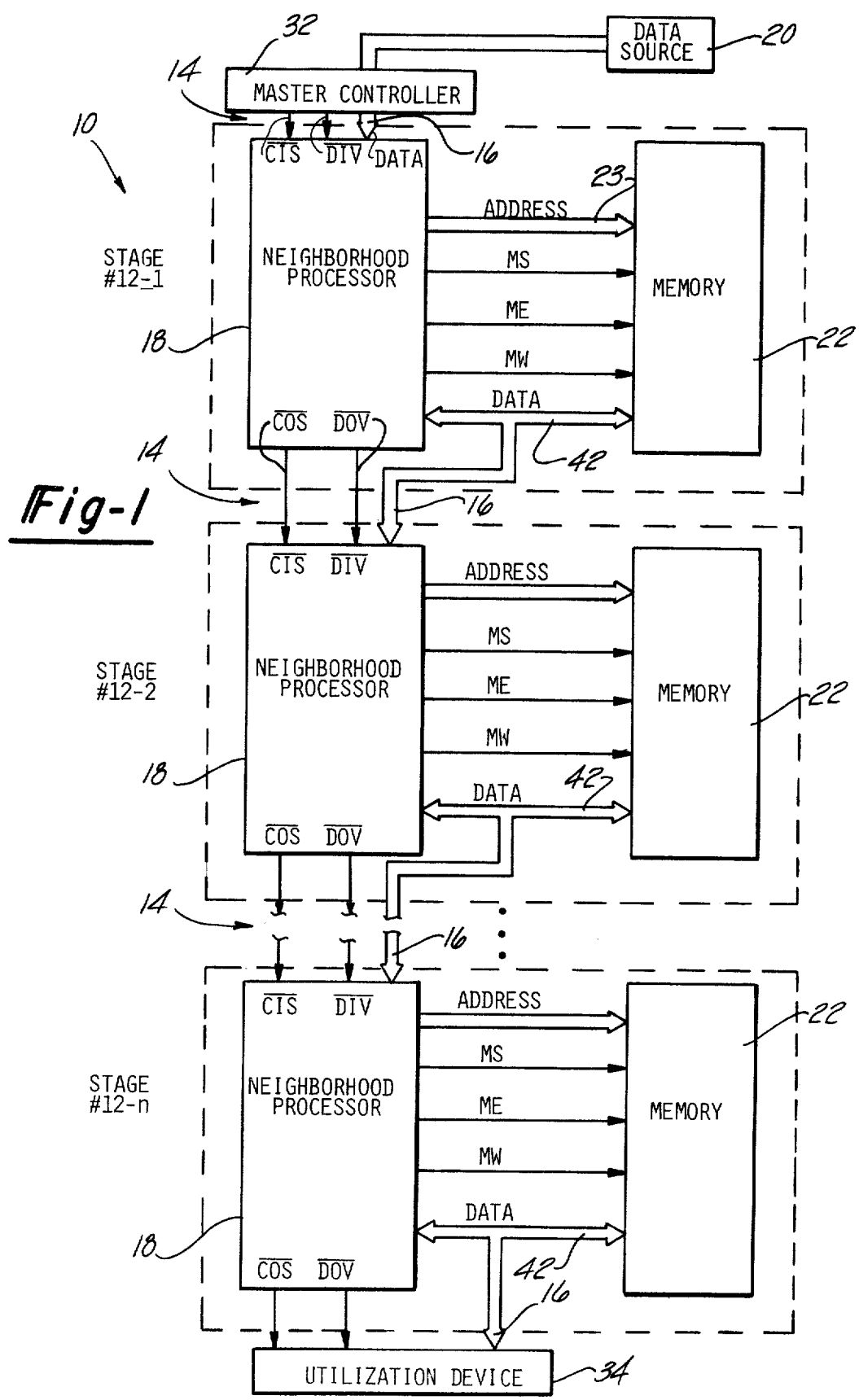
FIG. 1 is a block diagram of the preferred embodiment of the image analyzer system of the present invention.

FIG. 1 is a block diagram of the preferred embodiment of the system 10 of the present invention. System 10 includes a single pipeline of serially connected neighborhood processing stages 12-1 to 12-N. Each stage 12 is preferably formed on a single integrated chip. The exact structure of the semiconductor device for performing the circuit functions may vary from manufacturer to manufacturer, but one skilled in the art can readily implement the circuitry to be hereinafter described in integrated circuit form since the circuitry is specifically designed for large scale integration. Therefore, the system 10 may consist of an almost unlimited number of stages which can be readily interconnected by a relatively simple conductor layout on commonly used printed circuit boards.

It can be seen in FIG. 1 that the circuit board implementation will be simplified since there are relatively few interconnections between each of the stages 12. In fact, there is only a single data communication link 14 between each of the stages 12. The number of physical lines in the communication link 14 may vary somewhat, but in this example consists of two input control lines CIS and $\overline{\text{DIV}}$, two output control lines $\overline{\text{COS}}$ and $\overline{\text{DOV}}$, and an eight bit unidirectional bus 16. Bus 16 supplies both pixel data and transformation control instructions to the stages 12 in a uniquely structured sequence as will be more fully explained later herein.

Figure 2:
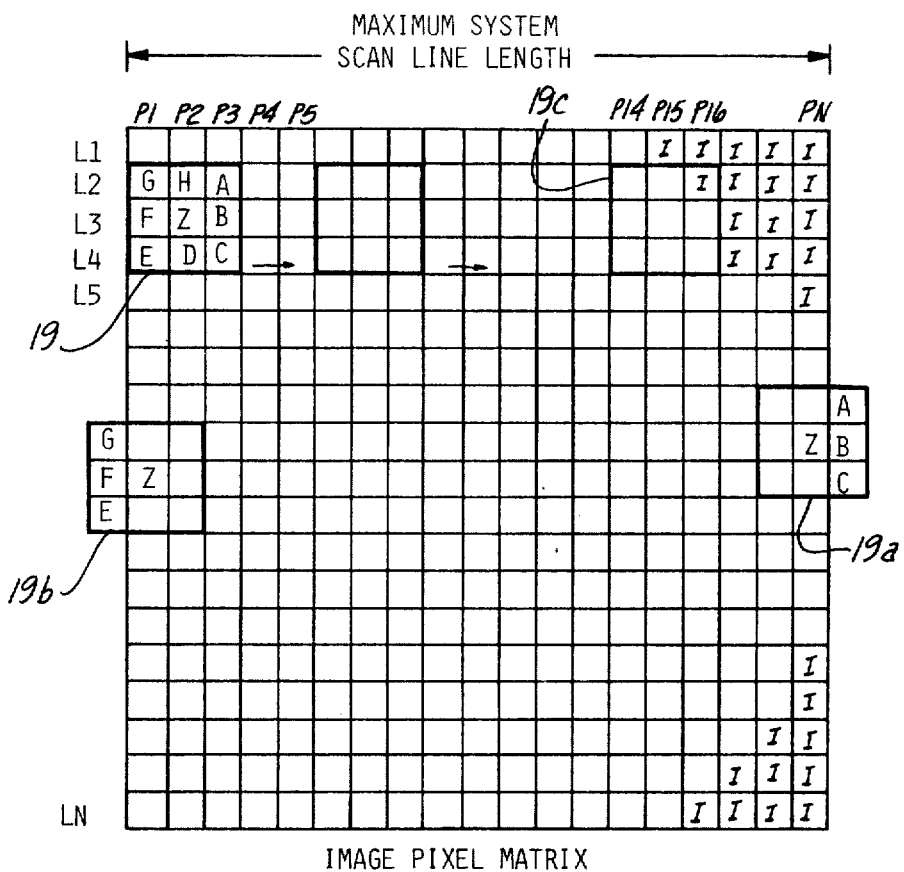
FIG. 2 pictorially represents a typical image matrix which can be analyzed by the system.

Each stage 12 includes a processor portion 18 for analyzing the pixel values and supplying a transformation output to the succeeding stage. The pixel values are provided by a data source 20. Referring for the moment to FIG. 2, data source 20 comprises a storage device which contains a matrix of pixel values constituting an image. Typically, the pixel values are derived from a sensor which scans the image and provides output data in a raster scan format in a manner known in the art. The values of the pixels may vary depending upon the type of sensor and preliminary data formatting circuitry utilized. For example, most of the known image sensing devices quantitize the sensor output signals and convert them to binary values consisting of either ones or zeroes. The ones or zeros generally correspond to black or white segments, respectively, of the image. However, some recently designed sensing devices are capable of providing three-dimensional informational data of an image. For example, the sensor may provide output signals which are a function of the distance between the scanner and various image portions. The derived pixel values of this sensor will be referred to as multi-valued and may contain up to 256 different states or values for an eight bit sensing device. For a more detailed discussion of three-dimensional image analysis see the above-identified patent application U.S. Ser. No. 73,818.

Not only do the image sensors provide different types of pixel values, but they often generate different rastor scan line lengths. The processor portion 18 of each stage performs a transformation of each pixel in the original matrix. The transformation will be a function of the value of a center pixel and its surrounding pixels or neighbors in the matrix. This type of transformation is known as a neighborhood transformation. In FIG. 2 a square or window 19 is shown surrounding a 3×3 array of neighboring pixels. The window contains a center cell Z and eight neighboring pixels A-H. The pixel values are fed down the pipeline of stages in a serial format, raster scan line by raster scan line. Thus, it can be seen that in order for a particular neighborhood window to be analyzed, the pixel values making up the window must be extracted from the entire matrix.

In the prior art, this is generally performed by a group of shift registers which have an appropriate number of stages such that the proper pixel values in adjacent lines of the matrix defining the window are presented for analysis or extracted in the appropriately timed sequence. The number of stages in the shift registers determined the maximum sensor scan line lengths that could be processed by the system. For example, if the shift registers had 1024 stages the maximum permissible sensor scan line lengths would be 1027 for a 3×3 window. Shorter sensor scan line lengths could be handled but it required placing dummy pixels in the data stream to fill up the gaps. For example, if the sensor scan line length was only 64 pixels wide, 963 (1027-64) dummy or invalid pixels were required. This greatly slows down the processing time for the system.

According to one aspect of the present invention, the system 10 provides the capability for efficiently analyzing image data matrices derived from sensors utilizing different scan line lengths. Referring back to FIG. 1, this is accomplished by the provision of memory 22 for each of the stages 12. Memory 22 communicates with processor 18 via a twelve bit address bus 23, a memory select line MS representing select signals MS∅ and MS1, a memory enable line ME, a memory write line MW, and an internal bidirectional data bus 42.

Figure 4:
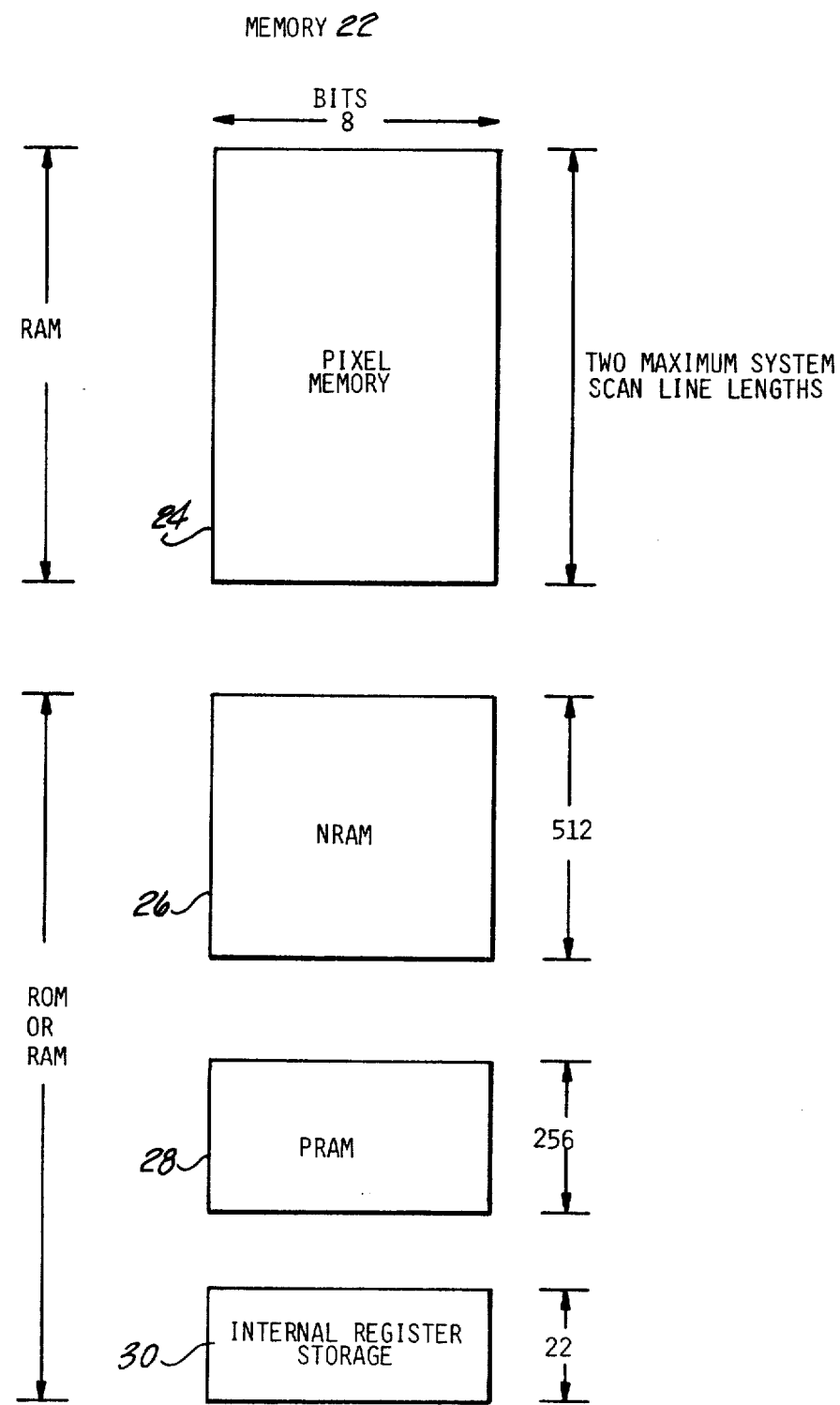
FIG. 4 is a representation of the functional layout of segments of the pixel memory portion of each stage.

FIG. 4 schematically shows the architecture of memory 22. It includes a pixel storage random access memory (RAM) 24, a neighborhood transform random access memory (NRAM) 26, point-by-point transform random access memory (PRAM) 28, and internal transform control register storage memory 30. The functions of the latter three memory segments will be described later herein. Of particular importance with respect to the present discussion is pixel storage memory 24.

Pixel storage memory 24 stores a given number of pixel values which are selectively loaded into processor 18 in a periodic fashion to sequentially access substantially all of the neighborhood windows in the image matrix.

In contrast with the fixed shift register line delay implementation, the present invention can readily accommodate different data formats from a variety of sensors without the concomitant increase in processing times. The size of RAM memory 24 is chosen so that it is large enough to store at least two maximum system scan line lengths of all of the various sensors expected to be encountered. The term maximum system scan line lengths is a user selectable number defining the number of pixels per line to be processed by the system. If the sensor at times produces raster scan lines which are less than the maximum system scan line length, dummy pixels (labelled I in FIG. 2) are placed in the data stream to produce a raster line length equal to the predefined maximum system scan line length.

Turning again to FIG. 1, a master controller 32 communicates with each stage of the pipeline over the serial communication link 14. Controller 32 may be any of a wide variety of data processing devices capable of generating and transmitting transformation control instructions and pixel data from source 20 over link 14 to the pipeline. In the preferred embodiment, controller 32 consists of a microprocessor such as the 2900 from Advanced Micro Devices of Sunnyvale, Calif.

The output of the last stage 12-N is coupled to a utilization device 34. The present invention finds particular utility for analyzing on-line information from data source 20 and providing an activating signal to utilization device 34 when a particular pattern had been detected. For example, data source 20 may be coupled to a sensor mounted over a conveyor belt, with the utilization device 34 consisting of an automation device which is automatically activated when a particular component part pattern is detected by system 10. Of course, a wide variety of diverse uses for system 10 may be readily envisioned.

Figure 3:
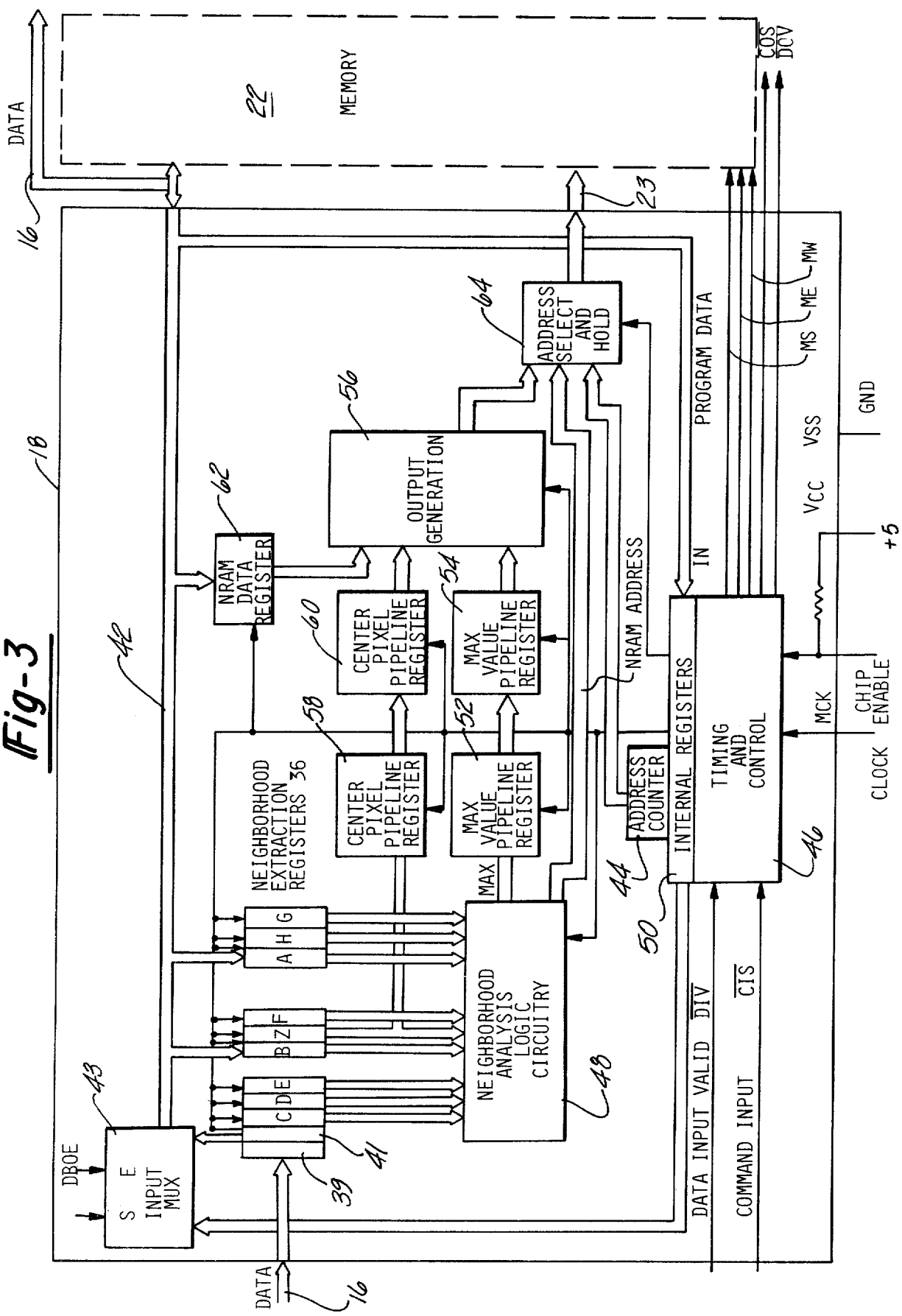
FIG. 3 is a block diagram of the preferred embodiment of the circuitry for each stage in the system.

Referring to FIG. 3, there is shown a block diagram of stage 12. Each stage 12 includes a plurality of neighborhood extraction registers generally designated by the numeral 36, each register being labelled with letters A-H and Z. When pixel data is supplied over bus 16, the data is shifted through neighborhood extraction registers C, D and E after being buffered by two preliminary registers 39 and 41. Simultaneously, the data is loaded into pixel memory segment 24 in memory 22 over a bi-directional internal data bus 42.

Figure 5:
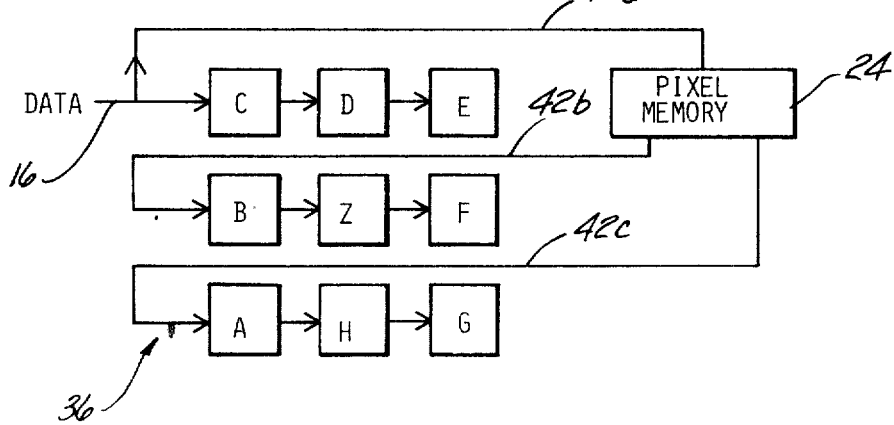
FIG. 5 is a block diagram showing a neighborhood extraction portion for each stage.

FIG. 5 is a simplified schematic which shall be referred to along with FIG. 6 to explain the unique loading sequence of the neighborhood extraction registers 36. Neighborhood extraction registers 36 can be envisioned as being configured in a 3×3 array having three rows and three columns, with each register in each row being serially coupled together. The CDE row is loaded directly from data bus 16. However, the BZF and AHG rows are loaded from pixel memory 24 which serves as a line storage device. As each pixel is received it is loaded into sequential address locations in memory 24. It is also shifted through the CDE row and then discarded. This process continues until memory 24 contains the first two scan lines. FIG. 6A shows the contents of pixel memory 24 after the first two scan lines have been stored.

When the first pixel of the third raster scan line is received and shifted into register C, the memory 24 locations containing the first pixel value of the first and second lines are addressed as shown in FIG. 6B. The first pixel of the first line is read from memory 24 and loaded into the A register. Likewise, the first pixel of the second line is loaded into register B of the neighborhood extraction registers 36. As is well known in the art, the loading and unloading of a memory is accomplished by way of address pointers which are represented by the arrows in FIG. 6. The address pointers are provided in this embodiment by the contents of an address counter 44 (FIG. 3) which supplies the correct memory address locations over address bus 23. With reference to FIG. 6B, address counter 44 would point to the memory 24 address location containing the first pixel of the first line, with the timing and control circuitry 46 (FIG. 3) causing a memory read operation for loading the A register over data bus 42. The same location is then used during a memory write operation to load the first pixel of the third scan line into the now empty location. Consequently, a minimum amount of processing time is used. During the next sequence, a binary number equal to one maximum system scan line length is added to the contents of address counter 44 to thereby address the memory 24 location containing the first pixel of the second line. A memory read operation is then performed to load the B register of neighborhood extraction registers 36.

Figure 6C:
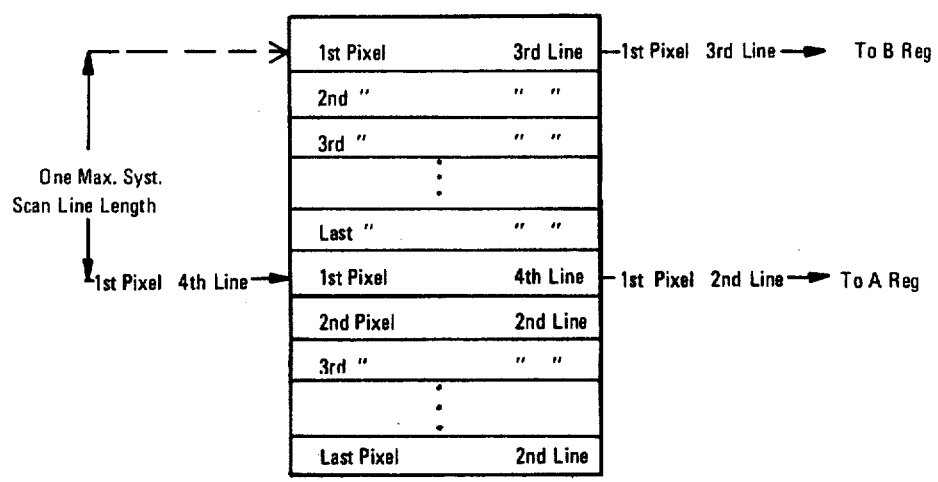
FIGS. 6(A-D) illustrates an example of the sequential steps carried out during the loading and unloading of the pixel memory of each stage to access neighborhoods in the image for analysis.
Figure 6D:
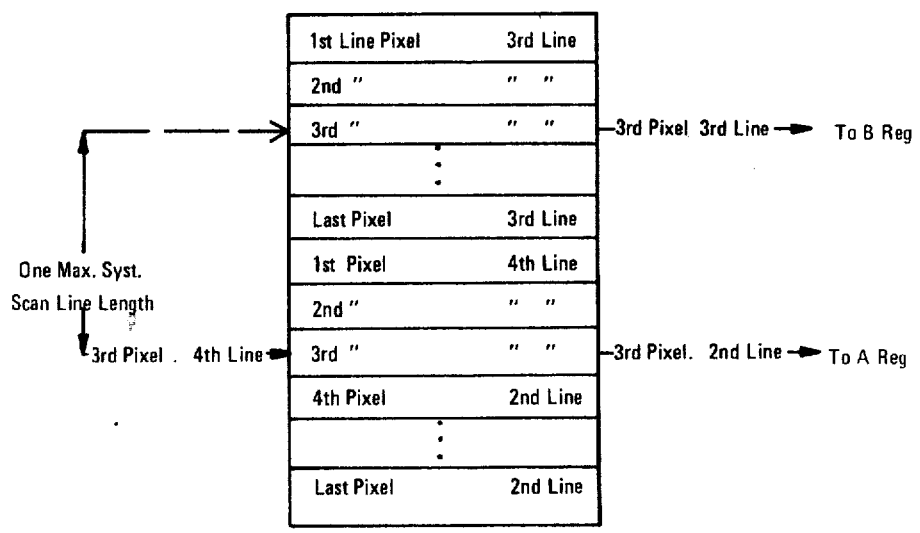
Figure 7A:
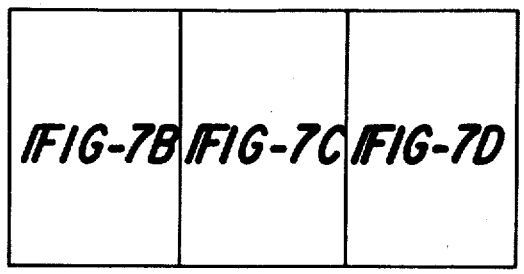
FIGS. 7(A-D) is an electrical schematic diagram showing some of the details of the stage circuitry shown in block diagram form in FIG. 3, with FIG. 7A showing the interconnection of FIGS. 7B-7D.

FIG. 6C shows the state of pixel memory 24 following entry of the first pixel of the fourth line. FIG. 6D shows the state of memory 24 when the neighborhood window 19 of FIG. 2 is contained in the neighborhood extraction registers 36. Thus it can be seen that the C register contains the third pixel of the fourth line; the D register contains the second pixel of the fourth line; the E register containing the first pixel of the fourth line; the B register containing the third pixel of the third line; the Z register containing the second pixel of the third line; the F register containing the first pixel of the third line; the A register containing the third pixel of the second line; the H register containing the second pixel of the second line; and the G register containing the first pixel of the second line.

The above process continues loading the neighborhood extraction registers 36 until each pixel has been placed into center cell register Z where it is transformed pursuant to the desired transformation parameters to be discussed. With reference to FIG. 2 the neighborhood window 19 (pixels in extraction registers 36) can be envisioned as moving in a serpentine pattern from left to right progressing down the page, with each succeeding new pixel changing the neighborhood window 19 such that all of the neighborhood windows in the matrix are sequentially accessed by the neighborhood extraction means 36.

Referring back to FIG. 3, each neighborhood window contained in the neighborhood extraction registers 36 is analyzed by neighborhood analysis logic circuitry 48. The details of neighborhood analysis logic circuitry 48 will be discussed in connection with FIG. 8 later herein. Briefly, neighborhood analysis circuitry 48 performs a wide variety of neighborhood transformations on each neighborhood window in the input matrix. The type of transformation to be performed is controlled by the contents of internal registers 50 which are loaded over internal data bus 42. The internal registers are disclosed in more detail in FIG. 9. One output of the neighborhood analysis circuit 48 is referred to as an NRAM address. The NRAM address is a nine bit vector in which each bit is a function of a corresponding pixel value in the neighborhood window. For example, the vector making up the NRAM address may be determined by those pixels in the neighborhood window which have a particular value of interest, those pixels having values above or below a given value, those pixels having the maximum value in the window, etc. The other output from the neighborhood analysis circuitry 48 is the absolute maximum value of all of the pixels in the neighborhood. The maximum value is coupled through pipeline registers 52, 54 to one input of an output generation circuit 56. Another input to output generation circuit 56 is the value of the center pixel in the neighborhood window. This is accomplished by coupling the output of the Z neighborhood extraction register 36 to output generation circuitry 56 through intermediate storage registers 58 and 60. The other input to output generation circuitry 56 is from an NRAM data register 62. Register 62 is sequentially loaded with the contents of a particular address location of NRAM memory 26 (FIG. 4). The particular address location is a function of the NRAM address from neighborhood analysis circuitry 48.

Output generation circuitry 56 effectively serves as a multiplexer which selectively couples one of its inputs (maximum value register 54, center pixel register 60, or NRAM register 62) to its output which is coupled to an address select and hold circuit 64. Select and hold circuit 64 also serves as a multiplexer which selects an address from output generation circuit 56, an NRAM address from neighborhood analysis logic circuitry 48, or an address from address counter 44 to address selected locations in memory 22.

Briefly, the sequence of determining the transformation for each stage is as follows. First, address select and hold circuitry 64 selects the output of address counter 44 in order to load the neighborhood extraction registers 36 as noted above. For each neighborhood window, analysis circuitry 48 may provide an NRAM address which is then selected by circuitry 64 to address selected memory locations of NRAM memory 26. The NRAM memory 26 comprises a table of transformation related signals which are programmed into each stage by controller 32. The addressed NRAM location data is then loaded into NRAM register 62 over internal data bus 42. The output generation circuitry 56 then selects one of its inputs as determined by the internal control registers 50. The address select and hold circuit 64 then selects the output of output generation circuit 56. This selected address serves to access PRAM memory 28 which acts as a point by point look up table for conditioning the output signals, if desired. The addressed memory location from PRAM 28 is then read out onto data bus 16 as the transformation output to the next stage.

Assume, for example, it is desired to transform all pixels in the image having a value of three into the value of six. The neighborhood analysis logic 48 would detect the pixel values in each window and generate a NRAM address pointing to a particular NRAM 26 location. The NRAM value at this location will be loaded into NRAM data register 62 which, in turn, will point to a location in PRAM 28 when selected by circuits 56 and 64. This location will contain the value of six which is coupled to the data bus 16 as the input to the next stage.

The circuit details for processor portion 18 are shown in detail in FIG. 7, with the exception of timing and control circuitry 46 and neighborhood analysis logic circuitry 48. Much of the circuit details are obvious by reference to the drawings and therefore will not be further described. To the extent possible, the same reference numerals will be used throughout the drawings to refer to common functional components and/or those groups of individual elements making up the functional components such as the individual eight lines comprising data bus 16, etc. By reference to the drawings it can be seen that input multiplexer 43 consists of a series of eight parallel coupled multiplexers 45 having one input coupled to outputs from internal registers 50 and their other inputs coupled to data lines from bus 16 via synchronizing registers 39 and 41. The selected outputs from the multiplexers 45 are coupled to internal data bus 42 when a plurality of tri-state buffers 47 are enabled. Thus, provision is made for internally checking the outputs from the internal registers 50 during diagnostic operations if multiplexer 43 is in such a state that the outputs from internal registers 50 are coupled to the multiplexer 43 outputs and onto internal data bus 42. Otherwise, the input data on bus 16 is coupled directly to internal data bus 42. However, the buffers 47 must be enabled by the DBOE signal from timing and control logic 46. If not, data is not passed to memory 22 or on to the next stage. More will be said about this in the discussion of how the pipeline is programmed.

Figure 7B:
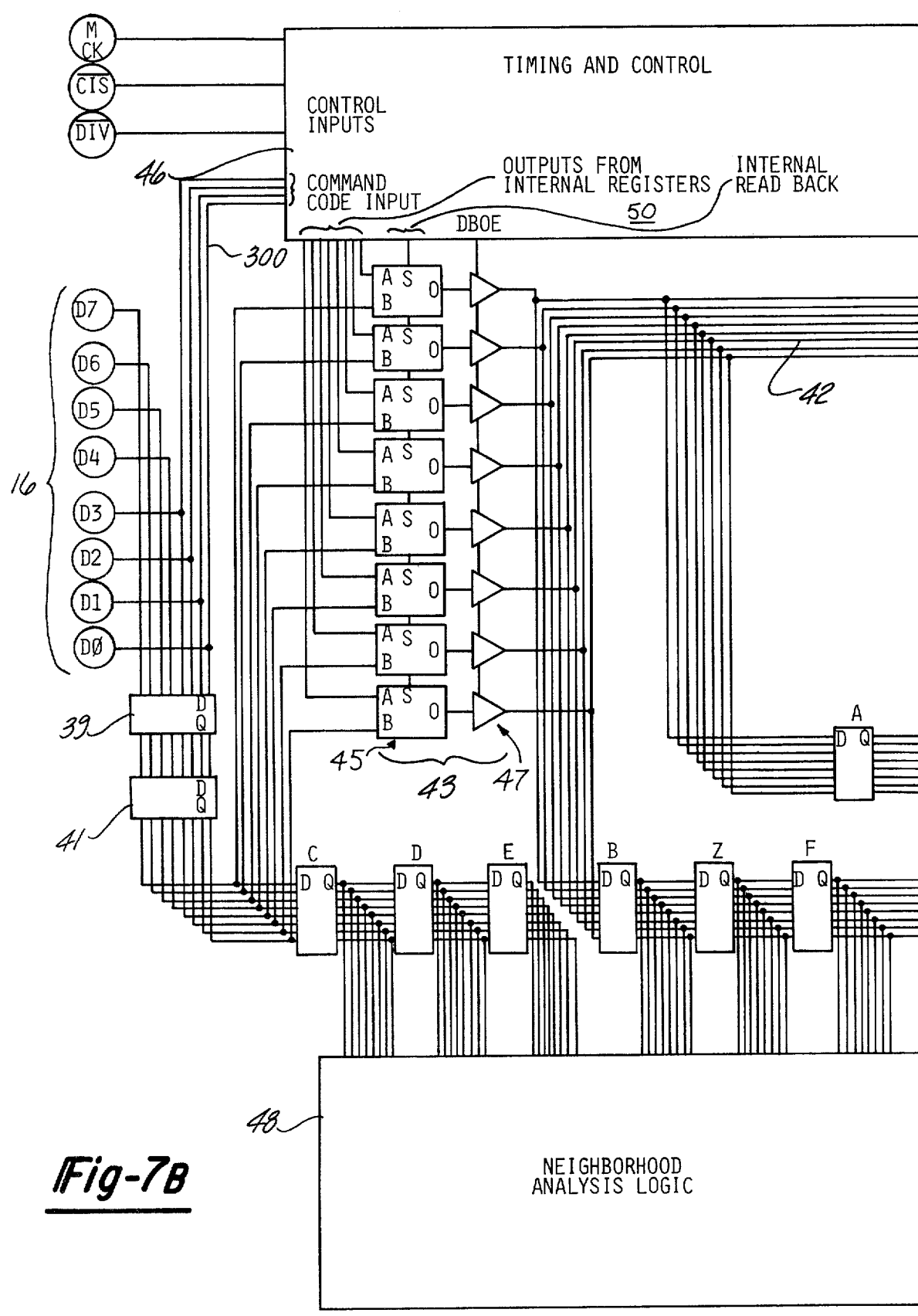
Figure 7C:
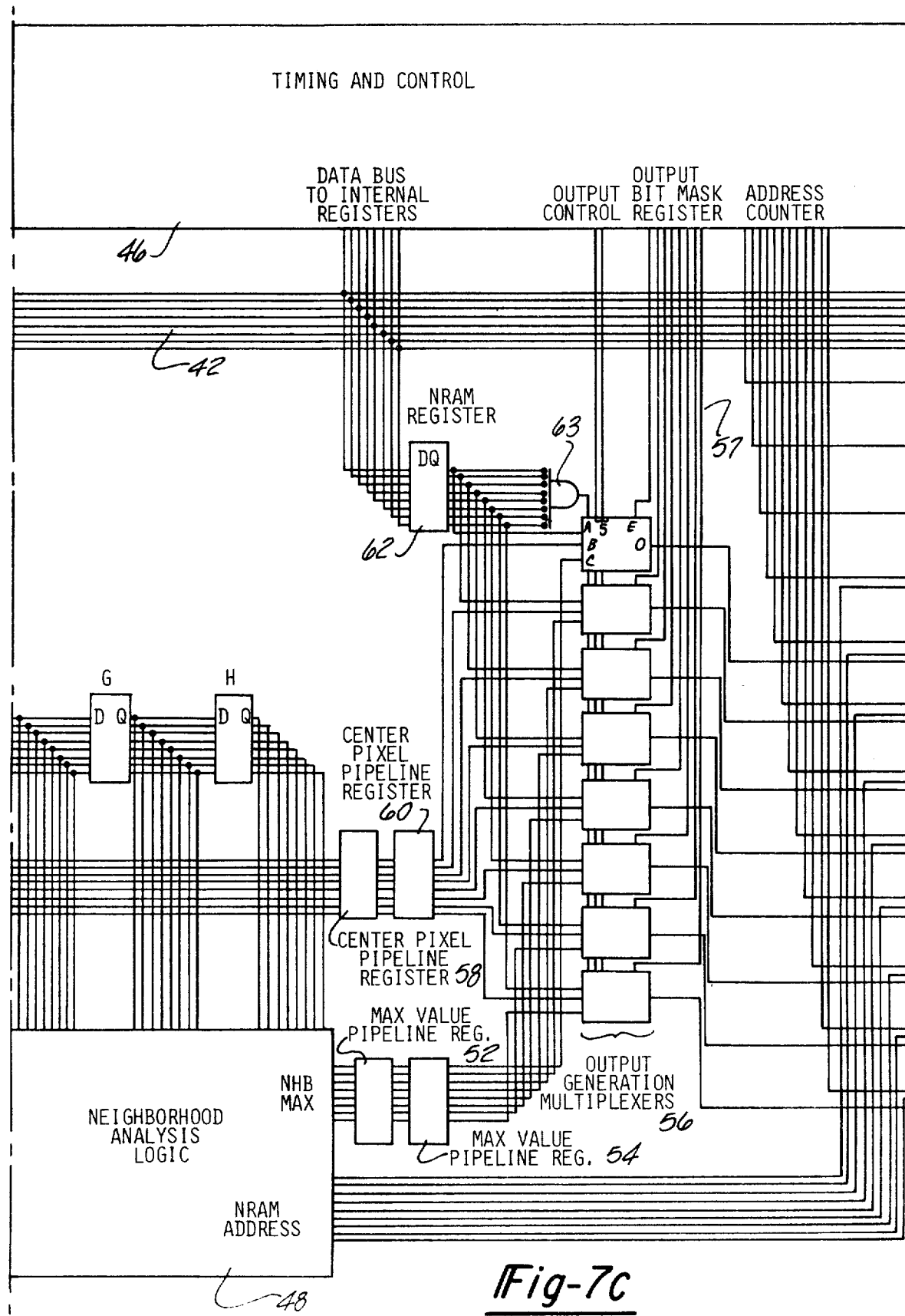
Figure 7D:
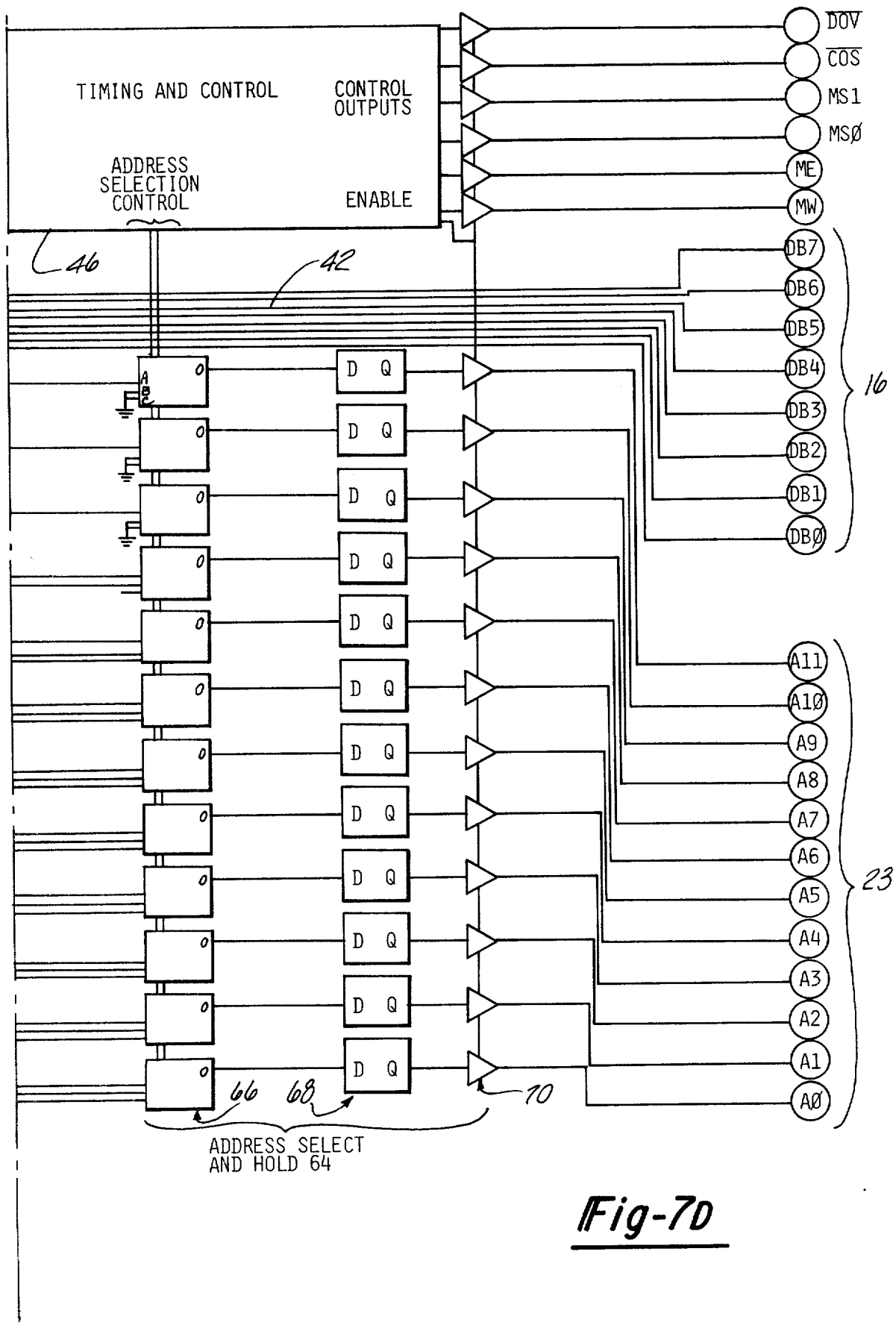

The output generation circuit 56 similarly consists of a plurality of parallel coupled multiplexers as can be seen in FIG. 7C. In FIG. 7D the address select and hold circuitry 64 includes a series of multiplexers 66 whose outputs are coupled to a holding register 68. Plural tristate buffers 70 are operative when enabled to couple the output of holding register 68 to address bus 23.

Figure 8:
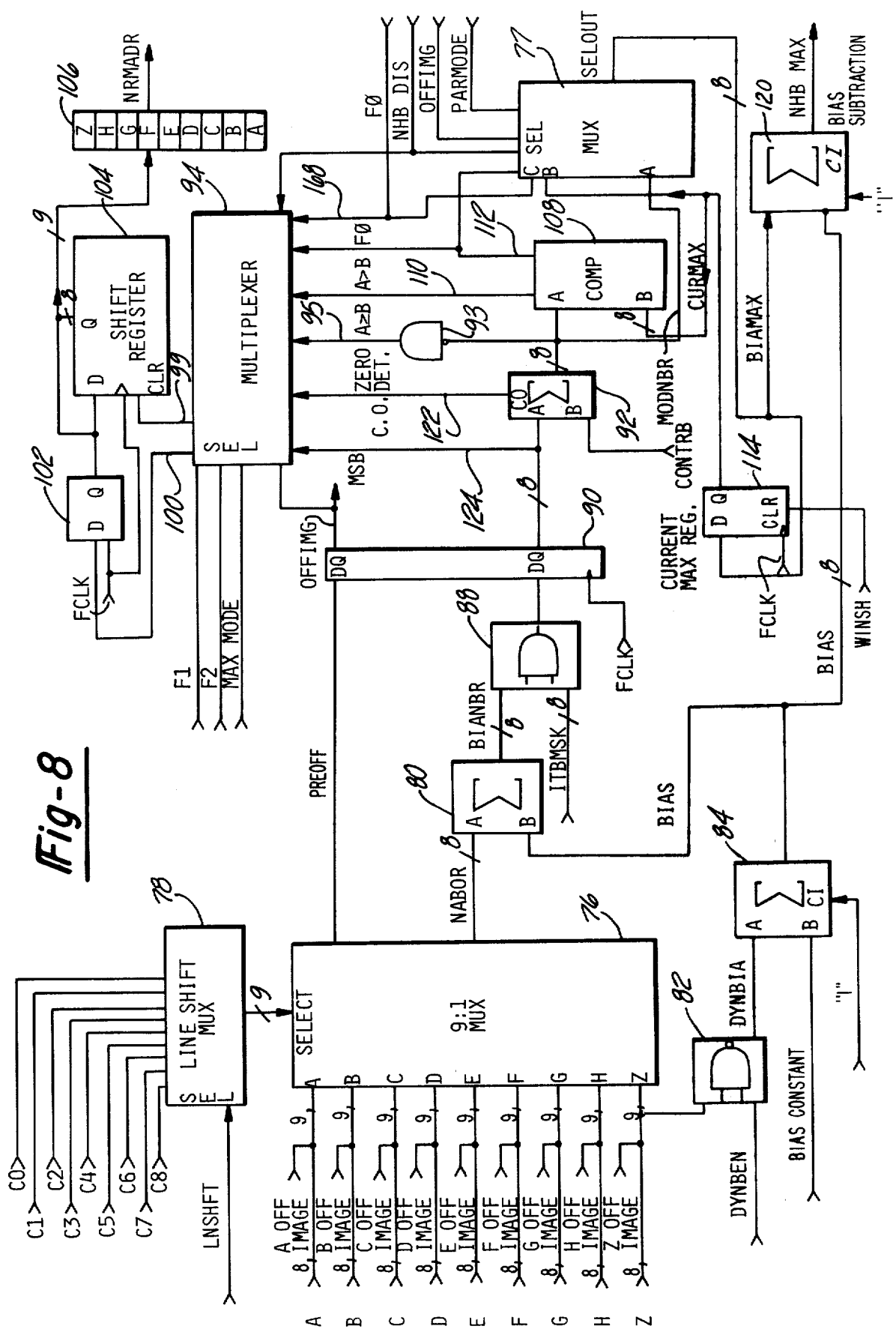
FIG. 8 is a schematic diagram of the neighborhood analysis logic circuitry shown in block diagram form in FIG. 3.

Turning now to FIG. 8, there is shown the details of the neighborhood analysis logic circuitry 48. Each of the nine neighborhood extraction registers 36 are coupled to selected inputs of 9:1 multiplexer 76. Multiplexer 76 serves to sequentially couple one of its inputs to its output labeled NABOR. A line shift multiplexer 78 takes in nine control signals C0–C8 from timing and control logic 46 and provides a coded output to the select input of multiplexer 76 for selecting one of the neighborhood extraction registers 36. Generally, multiplexer 76 sequentially selects neighborhood registers A–H and Z in that order. However, a wide variety of sequences can be established, if desired. A truth table for the line shift multiplexer 78 is shown in FIG. 10C. Hence, it can be seen that the particular neighborhood extraction register that is selected will depend upon the contents of multiplexer 78, input lines C0–C8 and a line shift signal LNSHFT from the timing and control logic 46.

A predetermined bias level or dynamic correction value may be added to the selected pixel value by adder 80. The bias value may be a function of the pixel value of the center cell Z and is generated by circuit components 82 and 84. Briefly, the bias value may be chosen to bring all of the pixel values within a given range that can be more accurately analyzed by the system. Other advantageous functions of this biasing circuitry will be later explained herein. The bias or dynamic data correction feature is disclosed in more detail in co-pending U.S. patent application Ser. No. 73,716, entitled "Dynamic Data Correction Generator For An Image Analyzer System", filed Sept. 10, 1979, which is hereby incorporated by reference.

The output of adder 80 is coupled to one input of an eight element AND gate 88. The other inputs to AND gate 88 are the input bit mask ITBMSK from internal control registers 50. The input bit mask signals can be used to selectively disable a particular bit or bits from being considered in calculating the transformation. There is also an output bit mask OTBMSK (FIG. 9) which forms an input to output generation multiplexers 56 (FIG. 7C). When a particular bit of the output bit mask is a 0 the output multiplexer 56 will select the corresponding bit of the original center value Z as shown in truth table of FIG. 10B. Combined use of the input bit mask and output bit mask can selectively disable bits from undergoing any transformation and thus those bits will pass to the next stage unmodified. This so called bit level enabling feature is disclosed in co-pending U.S. patent application Ser. No. 73,817, entitled "Bit Level Enable Circuitry For An Image Analyzer System", filed Sept. 10, 1979, which is hereby incorporated by reference. In this embodiment, the input bit mask ITBMSK and output bit mask OTBMSK are derived from the internal control registers 368, 370 as shown more clearly in FIG. 9.

The output of AND gate 88 is coupled to a buffer register 90. The output of register 90 is coupled to input A of adder 92. The other input B to adder 92 is a contribution value CONTRB from the internal registers 50. The particular contribution value will vary depending upon the analysis desired of the particular stage. For example, if one is interested in all of the pixel values in the window having a value of 5, the contribution value would be chosen to be the two's complement of 5; namely −5. Therefore, all pixel values having a value of 5 will produce a zero or logical low level at the output of adder 92 when added with the −5 contribution value. This zero level is detected by an eight low-true-input AND gate 93 which supplies a logical 1 (true) level over line 95 to one input of multiplexer 94. Multiplexer 94 is a modified 7:2 multiplexer which selectively couples up to two of its seven inputs to its two outputs 99 and 100. The select inputs for multiplexer 94 are derived from the internal registers (see FIG. 9) and an off image signal OFFIMG to be later described. A truth table for multiplexer 94 is shown in FIG. 10A. With all of the select inputs at a logical zero level, the multiplexer 94 couples the zero detect input line 95 to output line 100. Output line 100 is coupled to an input of a flip flop 102. The Q output of flip flop 102 is coupled to the D input of an eight bit serial-in-parallel-out shift register 104. Thus, shift register 102–104 will be loaded with a logical true level if the pixel value is equal to and opposite from the contribution value CONTRB and will otherwise be loaded with a logical false level. This process occurs for all of the pixels in the neighborhood window. After the last bit in the neighborhood window has been analyzed and loaded into flip-flop 102, the next clock pulse will cause the output of shift register 104 and flip-flop 102 to simultaneously be dumped into a nine bit buffer 106. Each bit position in buffer 106 corresponds with a particular pixel in the neighborhood window. The output NRMADR of buffer 106 provides the NRAM address vector to address and hold circuitry 64 (FIG. 3).

The preceding analysis is generally considered to be of a two dimensional variety. According to a feature of this invention, neighborhood analysis logic circuitry 48 is capable of performing a wide variety of alternative functions, including three-dimensional analysis, in the same stage. Three-dimensional analysis is generally made by adding particular contribution values to all of the neighborhood pixels and then detecting the maximum value within the window, with the maximum value being used as the stage transformation output. The present invention not only has this capability but may also detect which particular pixel or pixels in the neighborhood has the highest value. This is particularly advantageous where it is desired to locate a steep drop-off in the image, for example, to locate an edge of a table. This is accomplished through the use of a comparator 108 which sequentially compares the outputs of adder 92 with the preceding highest pixel value in each window. For example, the first pixel value (after including the bias and contribution) may be 10. This is coupled to the A input of comparator 108. At this time the B input of comparator 108 is at 0 since this is the first pixel in the window. Consequently, the pixel value on input A is both greater than or equal to (A≧B) and greater than (A>B) comparator input B causing both comparator output lines 110 and 112 to go high. The A input to comparator 108 is also coupled to an input A of a 3:1 multiplexer 77. A truth table for multiplexer 77 is shown in FIG. 10D. With line 112 high and the remainder of the select inputs low, the multiplexer 77 will be conditioned so that its output SELOUT will be coupled to input A. Multiplexer output SELOUT is connected to the data input of a current maximum register 114. The Q output of current maximum register 114 is connected to the B input of comparator 108. Thus, current maximum register 114 provides the maximum detected pixel value within the window, at least as far as the analysis has progressed.

The output lines 110 and 112 from comparator 108 are also coupled to inputs of multiplexer 94. When the MAX MODE select input is enabled, input line 112 is coupled to multiplexer output line 99 and input 110 is coupled to output 100. Line 99 is coupled to the clear input of shift register 104. Thus, the high level on line 112 causes line 99 to similarly go high and clear the contents of shift register 104. On the next clock pulse FCLK, flip-flop 102 will be loaded with a logical 1 level to indicate that the first pixel in the window has the current maximum value, as indeed it would since it is being compared against a 0 value.

Assume that the next pixel value in the window is 15. The same sequence will occur except that the current maximum register 114 will now be loaded with the number 15 to replace the previous maximum value of 10. After application of FCLK, the bit value in flip-flop 102 will now be at a logical 1 level, with all positions in register 104 being cleared.

If the next pixel in the window also has a value of 15 only line 110 will be true since 15 is ≧15 but 15 is not >15. Hence, multiplexer output line 100 will go high but line 99 will remain low so as to not clear the high level in the bit position in register 104 corresponding with the second or B neighborhood window pixel since it also had a value of 15 which is currently the maximum value in the window. Under these conditions, multiplexer 77 is conditioned so that its output SELOUT selects input B containing the output of current maximum register 114. Thus, the current maximum register 114 which is loaded by SELOUT remains at the value 15. This process continues for every pixel location in the window. Assuming that the remaining pixels have values less than 15, only the B and C positions of buffer 106 will be high thereby indicating that these pixel locations have the maximum value within the window. Additionally, the output SELOUT of multiplexer 77 will contain the absolute maximum value in the window, i.e. 15 in our example. If any pixels in a neighborhood are to be ignored for purposes of maximum value calculation, corresponding neighbor disable bits in control registers 362 are set. These bits are sequentially coupled to multiplexers 77 and 94 and serve to prevent the corresponding neighbors from becoming a maximum value. The bias or correction value is then subtracted at adder circuitry 120 to provide an output NHDMAX. This output is coupled to the input of pipeline register 52 (FIG. 3). Thus, this mode of operation provides the absolute maximum value of each neighborhood window and, in addition, the exact location within the neighborhood window of the pixel or pixels containing the maximum value.

The neighborhood analysis logic circuitry 48 also permits the user to determine whether the pixel values are above or below a given value. For example, if it is desirable to determine which pixels in the neighborhood contain values above the value of 6, the two's complement of the binary value 6 is applied as a contribution value to the B input of adder 92. All pixel values having a value greater than or equal to 6 will generate a carry out (CO) output on adder output line 122. In this analysis mode the multiplexer 94 output line 100 is coupled to input line 122. Accordingly, output buffer 106 will contain a logical one level in each pixel bit position which is greater than or equal to the value of interest.

Additionally, multiplexer 94 contains internal circuitry making the logical ANDing of carry out line 122 and a "not zero" condition on line 95. This will provide an indication as to whether the pixel is strictly greater than the contribution value and can be selectively read out on multiplexer outline 100.

Still another feature is the provision of the most significant bit MSB line 124. Line 124 is coupled to the most significant bit of the output of buffer register 90. Unless masked by gate 88, the output of buffer 90 consists of the summation of the pixel value in the neighborhood extraction register 36 and the bias or correction value. In one example of the preferred embodiment, the neighborhood extraction pixel value of the center cell Z register 36 is coupled to NAND gate 82. An enabling signal DYNBEN from internal register 374 (FIG. 9) activates NAND gate 82 and couples the complemented Z pixel value to one input of adder 84. By setting the correction value or BIAS CONSTANT from register 372 to 0 and the carry input to 1, the output of adder 84 will be equal to the value of the two's complement of center cell pixel Z. The output of adder 84 is coupled to the B input of adder 80. Thus, the value of the center cell is subtracted by adder 80 from the values of all of the pixels in the neighborhood. By way of binary arithmetic, the most significant bit of this addition will determine whether the pixel values in the neighborhood are greater than (or equal to) the center cell value or not. If the most significant bit is a logical one, this means that neighborhood pixel value NABOR is less than the center cell value. The states on most significant bit line 124 are coupled to multiplexer 94 and selectively to output line 100 in the MSB detect mode of operation. In this mode, output buffer 106 provides a vector in which each bit position provides an indication of whether its associated pixel is greater than the center cell value or not.

Figure 11A:
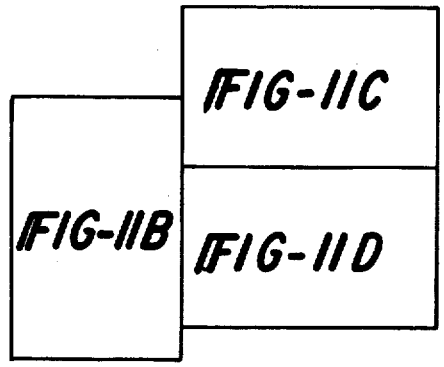
FIGS. 11(A-D) is a schematic diagram of portions of the timing and control circuitry which primarily provide off-image pixel detection, with FIG. 11A showing the interconnection between FIGS. 11B-11D.

The off image detection circuitry of the present invention is shown primarily in FIG. 11. As previously discussed, it is often necessary to provide dummy or invalid "off image" pixels depending upon the type of sensor used, system circuitry limitations, etc. Since these off image pixels do not contain real data from the standpoint that they contain image information, provision must be made for disregarding these pixel positions during image processing The present invention is especially useful when nonlinear or stepped borders are encountered. For example, circular image sensors have a tendency to provide rounded corners such as those shown in FIG. 2. Other types of image sensors may have dynamically varying line lengths.

According to this aspect of the present invention, controller 32 changes the state of the data control line $\overline{DIV}$ in link 14 depending upon whether the pixel data transmitted to the stage is valid (on image) or invalid (off image). Since the pixel data is generally (though not necessarily) formatted to contain at least some invalid border data, the start of each new line may be detected by the false to true transition of the data input signal $\overline{DIV}$. This is accomplished by circuitry 150 in FIG. 11B. The data input line $\overline{DIV}$ is coupled to one input of gate 152 which in turn is connected to an input of flip flop 154. When a new line is started flip flop 154 will go high when the next clock pulse is received. The Q output of flip flop 154 defines a start of line pulse SOL. The toggling of flip flop 156 defines the trailing edge of the start of line pulse SOL by feeding back its Q output to an input of gate 152. Thus, circuitry 150 generates a start of line pulse SOL on line 158 whenever line $\overline{DIV}$ changes to a true state thereby indicating that the next pixel will be the start of a new line. It should be noted that in cases where there are no dummy pixels in a line that controller 32 causes the data input valid signal $\overline{DIV}$ to change logic levels during the middle of the last pixel cycle on each line. Thus, the start of line signal SOL is generated even if there are no invalid pixels between scan lines.

Figure 11B:
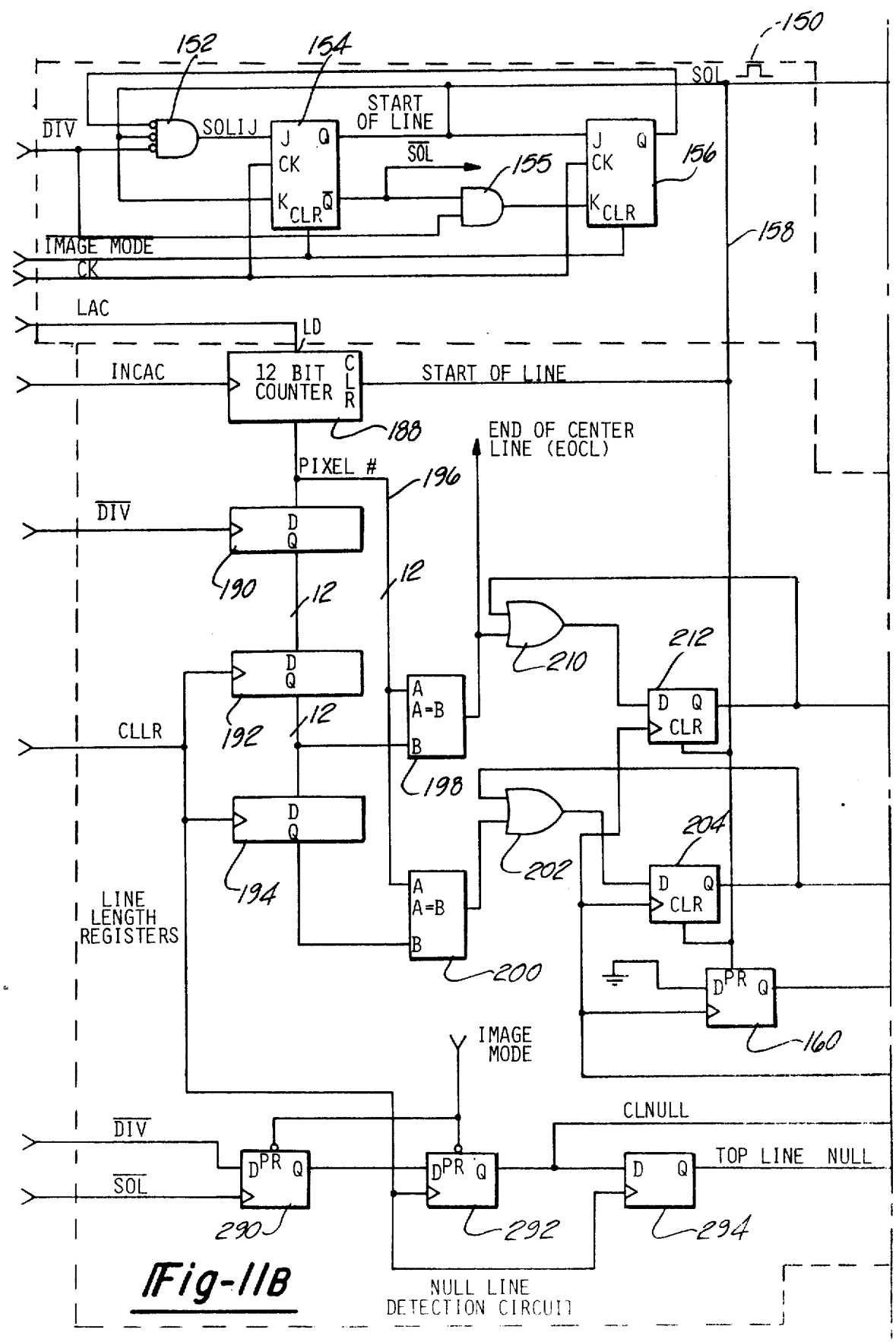
Figure 11C:
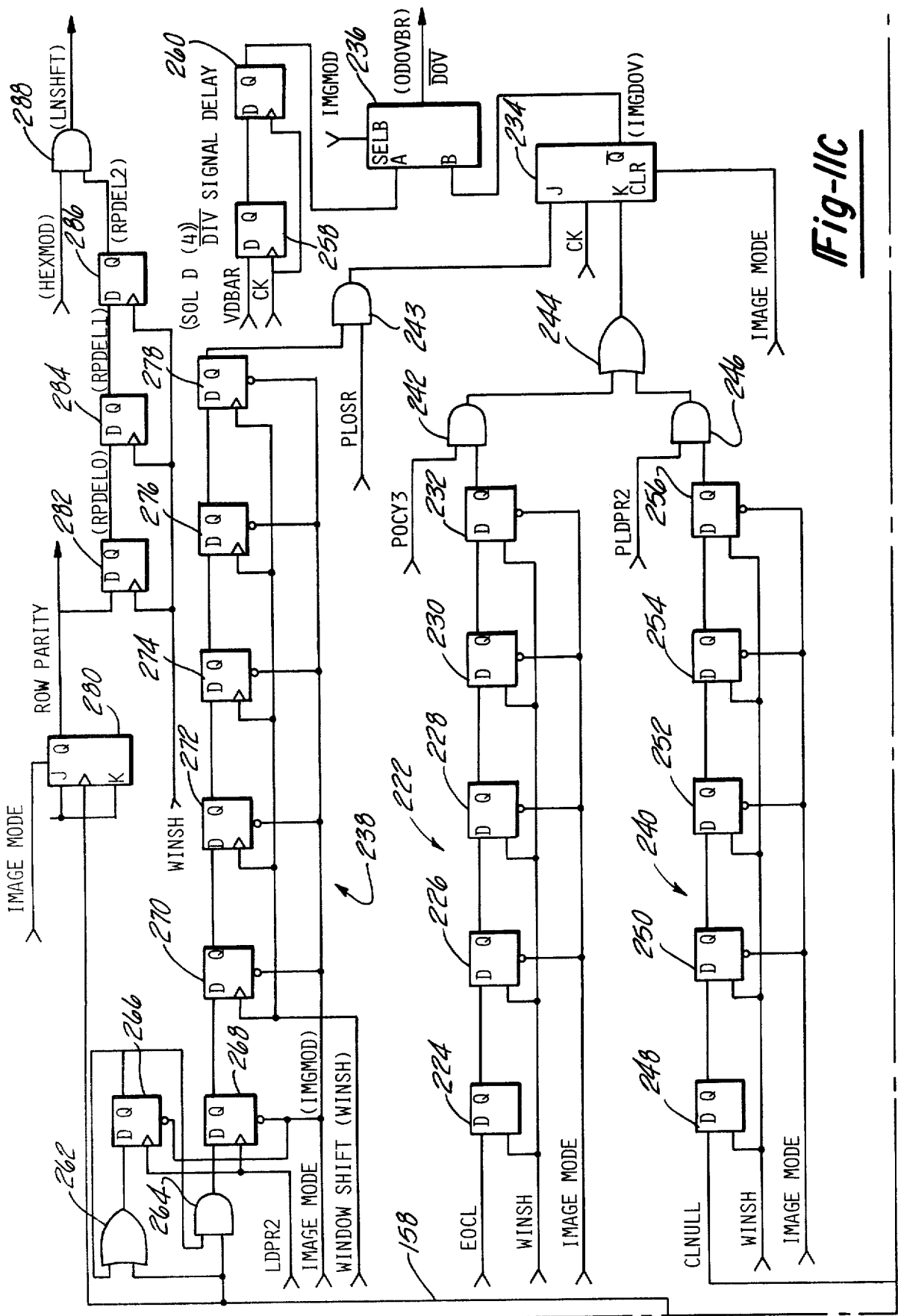

With reference also to the window 19a in FIG. 2, the start of line signal on line 158 will set a flip flop 160 (FIG. 11B). On the next window shift the high output of flip flop 160 is transferred to flip flop 162 (FIG. 11D). The output of flip flop 162 labeled "Window At Right Edge" serves to enable gate 164 whose output is coupled to the neighborhood analysis logic 48, specifically multiplexer 76 (FIG. 8). With reference to FIG. 8, multiplexer 76 will simultaneously select the contents of neighborhood extraction register A and place it on the neighbor line NABOR and the generated off image signal from gate 164 to the PREOFF line output. Register 90 senses the signal state of the PREOFF line and generates a signal OFFIMG which is coupled to one of the select inputs of multiplexer 94. Multiplexer 94 is thus conditioned to couple input line 168 to its output line 100 whenever OFFIMG is true. The contents of line 168 is a value F0 which has been preprogrammed into the internal registers 50 for use whenever this pixel position in the neighborhood window is determined to be off image. A wide variety of values can be chosen but generally they are limited to zeroes or ones. Thus, the detected conditions on lines 95, 122, and 124 are ignored when the pixel is determined to be off image.

Additionally, the off image signal OFFIMG is coupled to a select input of multiplexer 77. The off image signal to multiplexer 77 serves to disable the maximum value selection process. In this embodiment, this is accomplished by coupling the B input to the multiplexer output SELOUT instead of the input A from adder 92. Since input B is the current maximum within the window, the maximum value remains the same and is not altered even if the summation at adder 92 is greater than the current maximum within the window.

The above alteration of the transformation control circuitry occurs whenever a pixel is determined to be off image. With respect to the window 19a, the same alteration occurs for pixels B and C when tested by the neighborhood analysis logic 48 since gates 170 and 172 are enabled like gate 164.

During the next window shift, the window center will be positioned on the left hand edge of the matrix as shown by window 19b in FIG. 2. Flip flop 174 (FIG. 11D) which is coupled to the output of flip flop 162, is enabled on the next window shift. The Q output of flip flop 174 is operative to provide off image detection signals on lines G, F and E. The off image signals are coupled to multiplexer 76 input lines to similarly alter the neighborhood analysis for these pixels. Note that pixel positions G, F, and E correspond to the left hand edge of the window.

The cascaded series of flip flops 180-186 serve to detect off image pixels for the bottom row C, D, E of the neighborhood window. Whenever the data line $\overline{DIV}$ goes false (high) the flip flops are sequentially activated by each successive window shift such that off image signals are sequentially generated for pixel positions C, D and E as the window is shifted.

Special attention should now be directed to FIG. 11B in which counter 188 counts the number of valid (on image) pixels per line. This function can be accomplished by a variety of methods. In the present embodiment, counter 188 is also used as the address counter to load new pixels to and from memory 24. When the data signal $\overline{DIV}$ goes false indicating the end of valid data in a line, the current contents of counter 188 are clocked into register 190. The start of line signal SOL clears counter 188 at the beginning of the line such that it effectively keeps track of the number of valid pixels per line. The number of valid pixels for each successive line is monitored and shifted downwardly through register 190 into registers 192 and 194 at the appropriately timed sequence, that is, as successive lines are started.

This aspect of the invention may be more readily understood by way of a specific example. Assume that the neighborhood window is in the position of window 19c in FIG. 2. The register 194 will contain the number of valid pixels in the top window line L2. Register 192 will contain the number of valid pixels in the middle window line L3. Counter 188 would be in the process of counting the number of valid pixels in bottom window line L4. It can be seen that pixel position A in window 19c contains invalid data but that it is not part of a linear border. Pursuant to this invention, the off image detection circuitry is additionally capable of accomodating such nonlinear borders. Assume, for example, that register 194 contains the number 15, representative of 15 valid pixels on the line L2 and that register 192 contains the number 16, representative of the number of valid pixels in line L3. The current pixel number in the current input line (here line L4) is continuously supplied from counter 188 over line 196 to the A inputs of comparators 198 and 200. With window 19c one time step before that shown in FIG. 2 (i.e. to the left) line 196 would contain the number 15 indicating that pixel C is in the fifteenth pixel position. Comparator 200 would thus compare the current pixel number with the contents of register 194 and provide a logical one output indicating that the current pixel position corresponds with the last valid pixel value in the top line. This enables OR gate 202 to set flip flop 204. The Q output of flip flop 204 is coupled to OR gate 206 (FIG. 11D). Thus, at the next window shift the Q output of flip flop 208 goes high thereby providing an off image signal for position A in the neighborhood window shown in position 19c in FIG. 2. Accordingly, the neighborhood transformation logic takes into account this condition and alters the transformation as noted above.

With the window 19c in the position shown in FIG. 2 the output of comparator 198 similarly is true since current pixel number line 196 contains the number 16 which corresponds with the contents of register 192 representative of the number of valid pixels in line L3. Thus, OR gate 210 sets flip flop 212. This enables OR gate 214 (FIG. 11D) to set flip flop 216 during the next window shift. Thus, when window 19c is shifted to the right one more time, pixel position B in the window will be detected as being off the image. Note also, that pixel position H as well as A will now be detected as being off image through the provision of flip flop 218 which is set during the next window shift. During the next time step, pixel position G will likewise generate an off image signal via flip flop 220.

Note that when window 19c is shifted two times to the right, that the center cell Z would contain invalid data. Since the neighborhood transformation normally results in a transformed center cell this condition is defined as an invalid transformation. The system circuitry responds by asserting a false condition for the data output line $\overline{DOV}$. Briefly, this is accomplished by the end of center line circuitry 222 of FIG. 11C. The signal EOCL is derived from the output of comparator 198 (FIG. 11B). Flip flops 224–232 serve to delay the resetting of flip flop 234 an appropriate amount of time to synchronize the system. When the Q output of flip flop 234 is high, the output line $\overline{DOV}$ from multiplexer 236 going high will indicate an invalid data transmission state. Circuitry 238 similarly serves to control the state of the data output line $\overline{DOV}$ by delaying its true condition by an appropriate amount of time after the generation of the start of line signal SOL. Analogously, circuitry 240 is operative to control the state of data output line $\overline{DOV}$ when entire null lines in the image are detected.

Figure 12A:
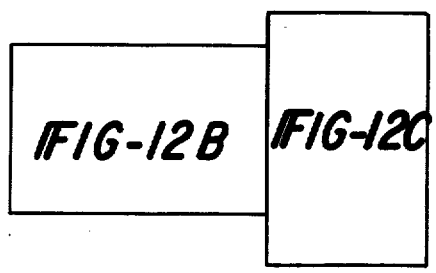
FIGS. 12(A-C) is a schematic diagram of further portions of the timing and control circuitry which primarily controls the state of each stage, with FIG. 12A showing the interconnections between FIGS. 12B and 12C.

The internal timing and control section shown in FIG. 12 has two basic functions: processing system commands and controlling internal stage timing. Since (to conserve interconnections) there exists only one bus 16 for the pipeline 10, both commands and pixel data to each stage must propagate from stage to stage through bus 16. The commands are divided into two groups: global commands and local commands. Global commands are executed by all active stages and pass unaltered down the pipeline 10. Conversely, a local command is executed by the first idle stage in the pipeline and is not passed on to the next stage. With reference to the state diagram of FIG. 13, the stages generally are placed into various operational states depending upon the command. For example, an idle stage, after executing any local command, enters the "Ignore Local" state 401 where all subsequent local commands are passed onto the next stage unaltered. In the preferred embodiment the commands are as follows:

1. Global activate (GA). This command sets all stages 12 in the pipeline 10 to a known initial state 400 (idle) from which all subsequent commands are valid, regardless of their present state.

2. Global Reset (GR). Similar to Global Activate in that this command takes all stages which are in any state except inactive (402) and places them into the idle state 400 to accept any command. This command will not effect those stages in an inactive state.

3. Global Start of Image (GSI). This command causes all stages 12 in the pipeline 10 which are in either the idle (400) or ignore local (401) states to prepare to process incoming image data which is subsequently placed on the bus 16.

4. Global Program Download (GPD). This command causes all stages in the idle or ignore local states (400, 401) to read the information in internal register storage segment 30 of memory 22 and shift it into the internal control registers 50 for direct access by the stage.

5. Local No Operation (NOP). This command causes the stage to ignore all local commands such that commands and data will subsequently pass through the stage unaltered.

6. Local Program (LP). This command causes the stage to store incoming data providing transformation control instructions for the stage over bus 16 into internal register storage 30, PRAM 28, and NRAM 26.

7. Local Readback-Internal (LRI). This command causes a stage to empty the contents of its internal registers 50 onto the outgoing data bus 16 via the activation of the internal multiplexer 43 during diagnostic operations.

8. Local Readback-Memory (LRM). This command causes the stage to empty the contents of the memory segments 26, 28 and 30 onto the outgoing data bus 16. Generally used for diagnostic operations.

6. Local Deactivate (LD). This command causes the stage to enter the inactive state 402, pass all incoming commands unaltered to the next stage, and ignore all commands with the exception of the Global Activate command which will restore the stage to the normal (idle) 400 state.

Since both commands and data (either program or image) enter via the data bus 16, the stage must be able to differentiate which type of information it is processing. This is accomplished by the provision of two input control lines $\overline{CIS}$ and $\overline{DIV}$ which are used to synchronize and coordinate stage operation. $\overline{CIS}$ is used to indicate a command input and $\overline{DIV}$ is used to indicate valid control data as well as the start and end of pixel lines as noted before with respect to the off image detection circuitry. To issue a command to the stage, master controller 32 asserts the $\overline{CIS}$ line 14 for at least two clock cycles to indicate validity, during which the command code is placed on the bus 16. The data present on four of the bit lines 300 (FIG. 12B) at the first rising edge of the master clock with CIS asserted will be interpreted as a command to the stage.

Figure 12B:
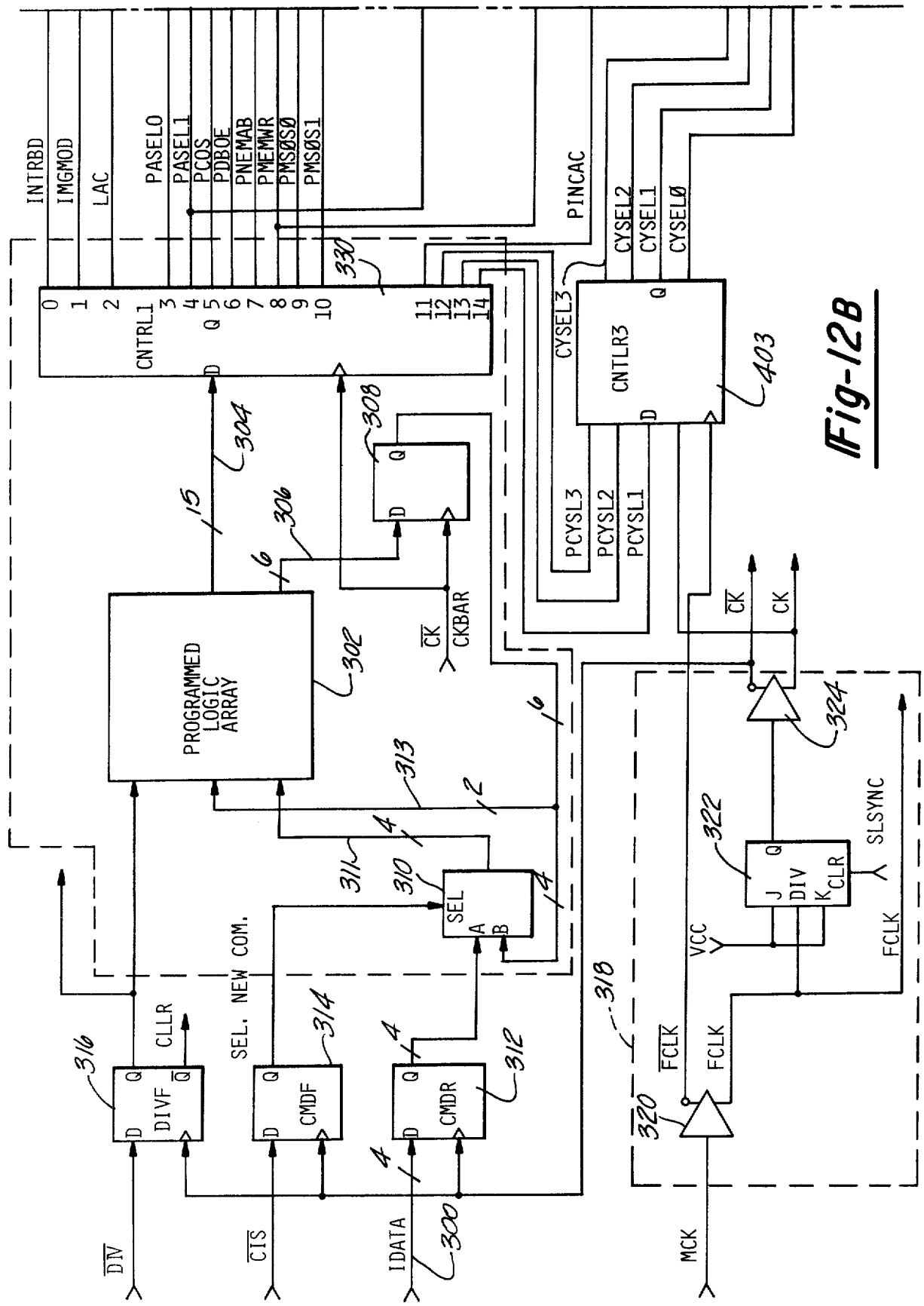
Figure 13:
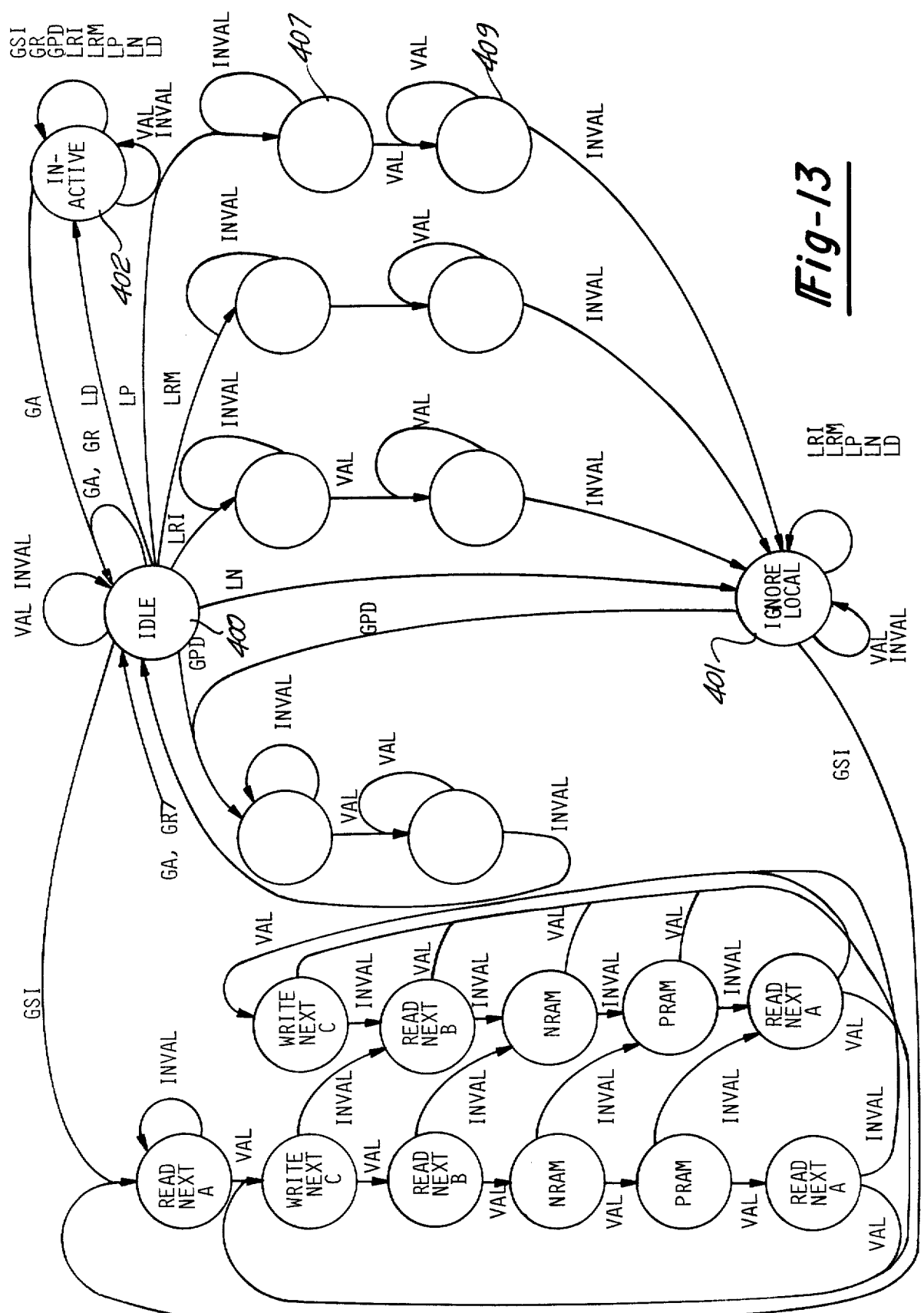
FIG. 13 is a state diagram of the preferred embodiment of the invention.

With specific reference to FIG. 12B, a programmable logic array 302 serves as a decoder for providing internal control signals on line 304 and a current state signal on line 306 as a function of the decisional logic applied to its inputs. In this embodiment, the current state signal on line 306 is a six bit digital signal in which the two most significant bits define the major operational state of the stage, with the four least significant bits generally corresponding to the state information of the current command being executed. With reference to FIG. 13, the major operational states are idle 400, ignore local 401, and inactive 402; with the remaining circles representing substates which are carried out in response to a given command. The current state signal is latched into latch 308 and fed back in an appropriately timed sequence to inputs of PLA 302 and multiplexer 310. The two bits containing the major state information are coupled to an input of PLA 302 over line 313. The remaining four bits of the current state signal are coupled to one input of multiplexer 310. The other input to multiplexer 310 is coupled to the four bit line segment 300 of data bus 16 through latch 312. A select input of multiplexer 310 is coupled to the command input line $\overline{CIS}$ through latch 314. When the command input line $\overline{CIS}$ is true, multiplexer 310 couples the new command on line 300 to an input of PLA 302 over line 311. Otherwise, the current state information is fed back through multiplexer 310 to the PLA input over line 311. The other input to PLA 302 is from the data input line $\overline{DIV}$ through latch 316.

An internal clock generator circuit 318 provides internal clock pulses in synchronization with the machine clock pulse from master controller 32 in a known manner.

Generally, the first command generated by controller 32 is a Global Activate command. The digital code corresponding to this command is placed upon the four bit segment 300 of data bus 16 and the command input line $\overline{CIS}$ is asserted. Multiplexer 310 thus couples the new command signal to its output 311. PAL 302 will respond to the command by generating a unique current state signal on line 306. A Global Activate command will place the first stage into the idle state 400. Current state latch 308 will feed back information to multiplexer 310 and PLA 302 indicating that the stage is in the idle state. The Global Activate command will cause PLA 302 to generate certain transformation control instructions for the internal stage components. In addition, it controls the state of the stage command output line $\overline{COS}$. Register 330 serves to fan out the control instructions for generating various stage functional operations such as memory selection, etc. Register 330 additionally causes the command output line $\overline{COS}$ and data bus enable DBOE lines to be asserted (see FIG. 12C) in response to a Global Activate command. Thus, the next stage in the pipeline will have its command input line $\overline{CIS}$ in a true state indicating that the data on its data bus segment 300 contains a new command. The input data bus 16 of the previous stage is coupled to the output bus via internal data bus 42 by the enabling of input multiplexer 43 (see FIG. 7B) by the data bus output enable signal DBOE.

The Global Activate command, as do all global commands, propagates down each stage of the pipeline 10, placing each stage sequentially into the idle state. A Local Program command may then be utilized to selectively program the first stage in the pipeline. The Local Program command is placed on data bus 16, with the command input line $\overline{CIS}$ being asserted. Multiplexer 310 thus couples the new command on line 300 to PLA 302 via line 311. As noted above, all of the stages are in the idle state due to the previous Global Activate command. In the idle state, the stages are permitted to operate on local commands. Accordingly, the Local Program command is carried out by the instructions generated by PLA 302. However, since a local command does not propagate down the pipeline, register 330 does not assert the command output signal $\overline{COS}$. Thus, the next stage does not recognize the data on its input bus as a command. In the loop labeled LP in FIG. 13, the first state 407 represents the first step in executing the Local Program command in which the stage components are preconditioned for accepting and loading the forthcoming data into memory 22.

Central controller 32 then asserts the data input valid line $\overline{DIV}$ which causes a shift to state 409. Controller 32 operates to send up to 790 bytes of information on data bus 16. This information is loaded into stage memory 22 sequentially from the bottom of internal register storage memory 30 to the top of NRAM 26. Again, it is important to note that this data will not be acted upon by other stages in the pipeline. When the data input valid line $\overline{DIV}$ goes false indicating the end of the transformation control instructions, the stage enters the ignore local state 401. PLA 302 responds by providing an ignore local code on the two most significant bits of the current state signal which are fed back to its input over line 313.

Figure 12C:
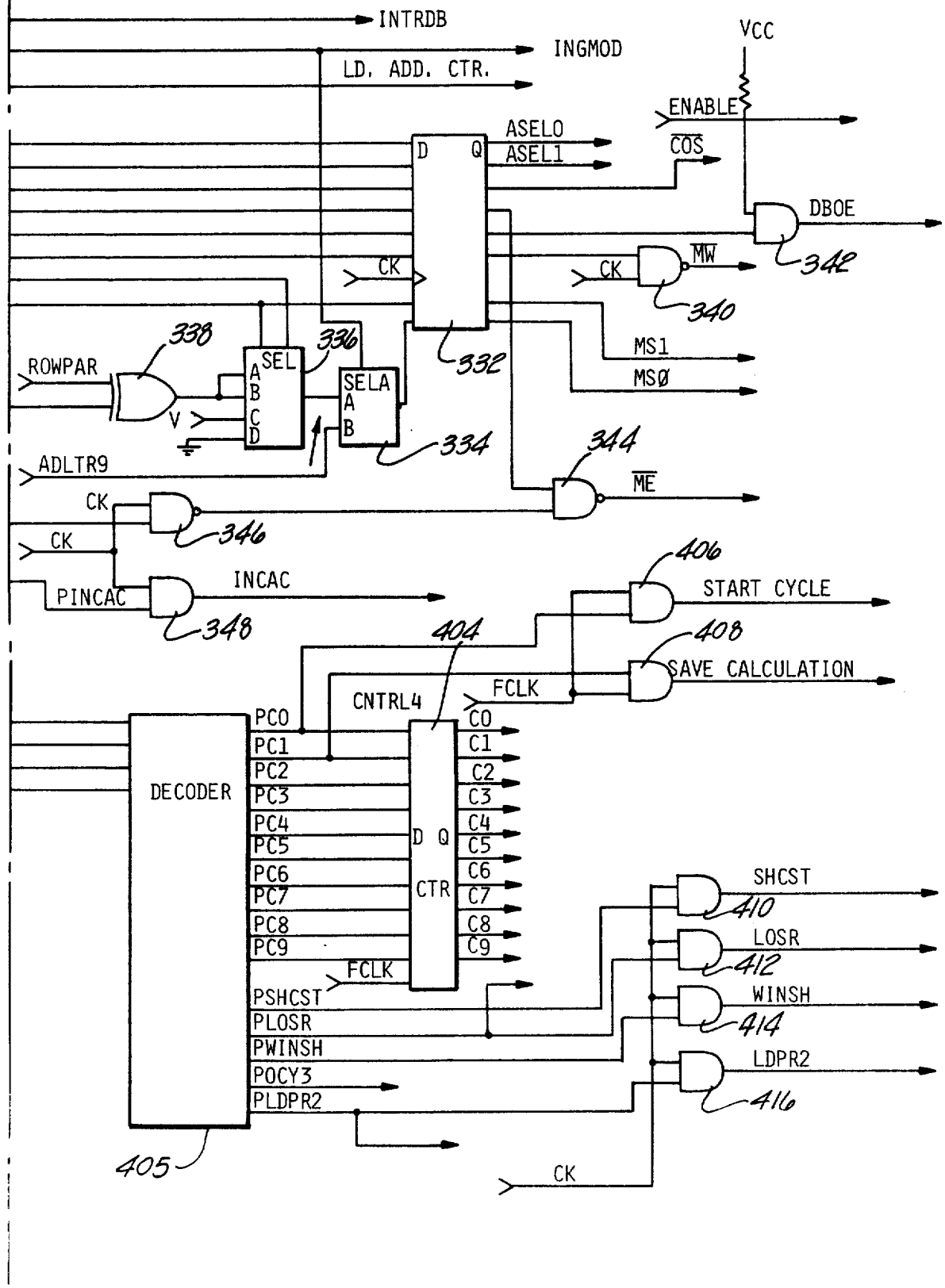

To program the next stage in the pipeline, controller 32 follows the same sequence as noted above except that new transformation control instructions will be loaded into the memory 22 of the second stage. It is important to note that upon receipt of a subsequent Local Program command the first stage will pass all data to the next stage unaltered since it is in the ignore local state 401. This occurs as follows. The second Local Program command will appear on line 311 to PLA 302 of the first stage. However, the two bits on line 313 will indicate that the first stage is in the ignore local state. In response, the command output line $\overline{COS}$ of the first stage will be set in a true condition in order to pass the local program command to the second stage. Additionally, PLA 302 enables input multiplexer 43 (FIG. 7B) to pass on all incoming data to the next stage by causing the generation of the signal DBOE through the action of register 330 and flip flop 332 (FIG. 12C). It should be noted that the second stage will not pass this data on to the third stage. Instead, it is programmed by this Local Program command and its associated transformation control instructions. After the second stage is programmed it will enter the ignore local state so that the next Local Program command can be used to program the third stage. This process continues until all of the required stages in the pipeline are programmed.

Figure 9:
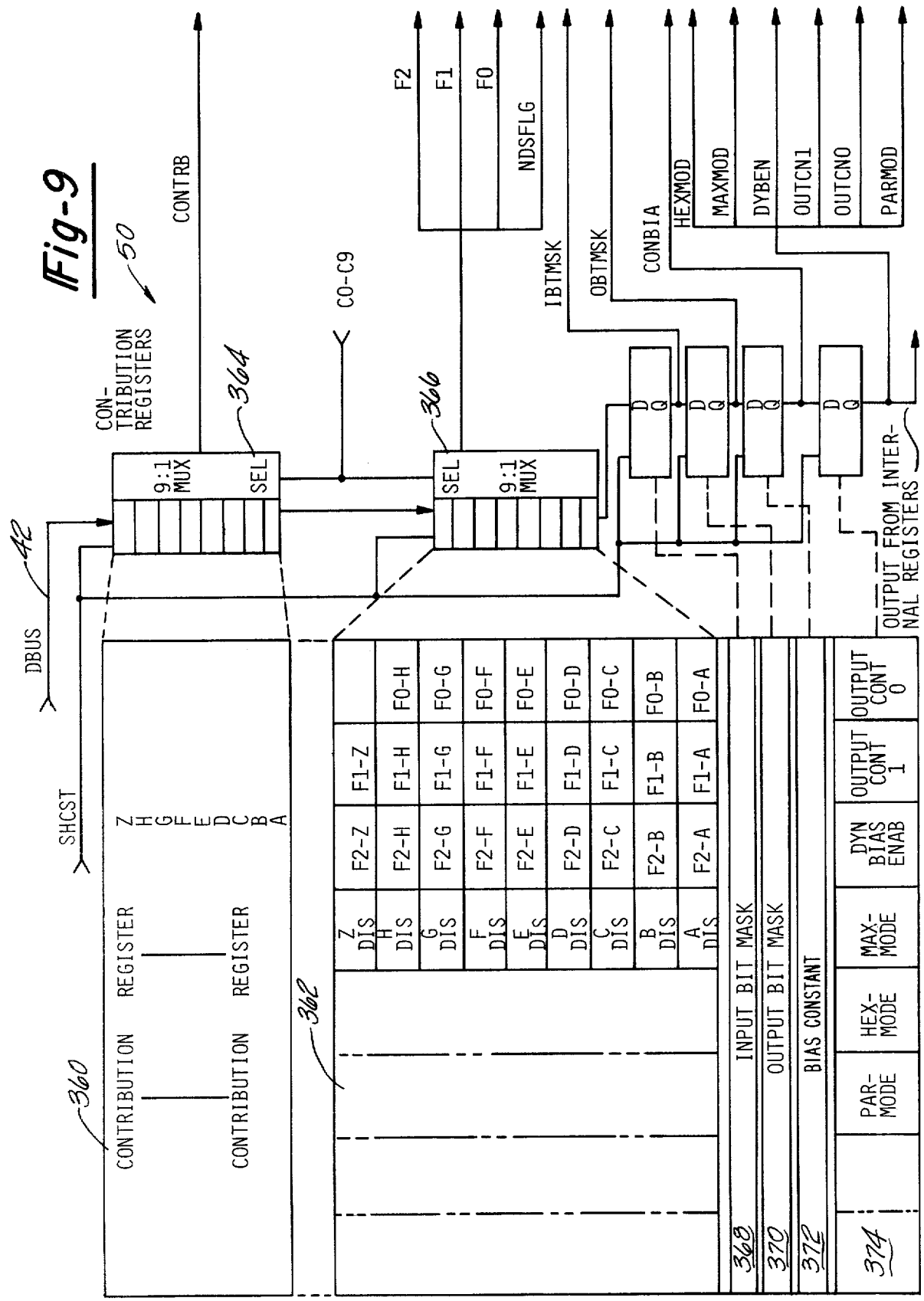
FIG. 9 is a representation of the content of the internal registers shown in block diagram form in FIG. 3.

After the entire pipeline is programmed, the controller 32 generates a Global Program Download instruction (GPD). Since this is a global instruction, all of the stages will respond even though they are in an ignore local state. The Global Program Download command causes each stage to load their internal registers 50 (FIG. 9) with the contents of the internal register storage segment 30 of memory 22. With reference to FIG. 9, the 22 bytes of data in memory 30 are shifted into a series of internal registers 50. A group 360 of registers provides contribution values for the pixel positions in the neighborhood window to 92 of FIG. 8 via multiplexer 364. Register group 362 provides select signals to the multiplexer 94 in the neighborhood analysis logic decoded by decoder 405 (FIG. 12C) to provide the appropriately timed signals to the stage components for carrying out that state. The table below details the cycle by cycle operations of the processing stage during image transformation.

| CYCLE | Data Bus 16 | ERIM-Internal Bus 42 | Address Bus 23, MS | $\overline{\text{ME}}$ | $\overline{\text{MW}}$ |
|---|---|---|---|---|---|
| Latch incoming pixel in Data Pipeline Register. Begin read of next value for neighbor A. | Don't care | Will have new value for neighbor A. Bus direction is from memory to logic | Address of new value for neighbor A MS1=0 | 0 | 1 |
| Latch A Register. Begin write of pixel latched in Data Pipeline Register into memory | Don't care | Value of incoming pixel latched during Cycle 1. Bus direction is from logic to memory | Same as address for Cycle 1 MS1=0 | First half-cycle $\overline{\text{ME}}$=1<br>Second half-cycle $\overline{\text{ME}}$=0 | First half-cycle $\overline{\text{MW}}$=1<br>Second half-cycle $\overline{\text{MW}}$=0 |
| Begin read of next value for Neighbor B. | Don't care | Will have new value for neighbor B. Bus direction is from memory to logic. | Same as address for Cycle 1, but with MS0 inverted, selecting other pixel memory bank. | 0 | 1 |
| Latch neighbor B and shift window position. Begin read of NRAM value | Don't care | Will have value of NRAM. Bus direction is from memory to logic. | NRAM address calculated during previous pixel time. MS0=0 MS1=1 | 0 | 1 |
| Latch NRAM value. Begin read of PRAM | Incoming pixel from previous stage. | Will have value of PRAM. Bus direction is from memory to logic. This value is a transformed pixel which is received by the next stage 12 in pipeline 10. | PRAM address calculated during previous pixel time. MS0=1 | 0 | 1 | portion 48. The particular registers in groups 360 and 362 corresponding to the neighboring pixel under analysis are selected by multiplexers 364, 366, respectively under the control of neighbor select signals C0–C9. Register 368 provides signals for disabling selected bits in the incoming pixel data to the neighborhood analysis logic 48, whereas register 370 serves to provide signals over lines 57 to multiplexers 56 (FIG. 7C) to mask selected bits in the transmitted result which is provided to the next stage. Register 372 provides the correction value or BIAS CONSTANT for the stage. Each bit in register 374 provides control signals to selected components in the stage.

After the internal registers 50 for the stages have been loaded, master controller 32 will generate a Global Start Of Image command. This prepares the stages for processing the image data which then follows over bus 16. The Global Start of Image command is interpreted by PLA 302 (FIG. 12B) to generate an image mode signal IMGMOD to signal the stage components to implement the image processing as described herein before, with the output of the first stage being coupled to the input of the next stage and so forth on down the pipeline. In this embodiment, the stage undergoes five operational cycles for analyzing each pixel window. The image mode states are shown in the left hand portion of FIG. 13. Briefly, control register 330 provides cycle select signals to latch 403 (FIG. 12B) depending upon the current stage state. The cycle select signals are Cycles 1–3 are read and write operations to memory 22 to construct a new window in neighborhood extraction registers 36. Cycle 4 is a read cycle from NRAM 26. Cycle 5 is the read cycle from the PRAM 28.

Generally, the image processing continues down the pipeline where the output of the last stage is coupled to a utilization device 34 (FIG. 1). A wide variety of diagnostic operations can be performed by appropriate use of the Local Readback-Internal (LRI) and Local Readback-Memory (LRM) instructions. Individual stages can be reprogrammed by the appropriate use of the local no operation (NOP) and Local Program instructions.

Other memory organizations could be used in different embodiments. For example, the memory 22 could be organized as four separate banks of memory; two pixel line storage banks, an NRAM bank, and a PRAM bank. This would allow memory access to be performed in parallel, thus allowing a higher processing speed. While this invention has been described in connection with a particular example, other modifications will become apparent to one skilled in the art by studying the specification, drawings, and the following claims.

We claim:

1. In an image analyzer system having at least one neighborhood transformation stage including a plurality of neighborhood window storage registers for temporarily accessing substantially all of the neighborhoods of pixel values in the image, wherein the improvement comprises a neighborhood transformation stage which can provide a wide variety of image analyses, said stage including:

adder means having at least two inputs and an output, operative to provide at its output the sum of the two values applied to its inputs;

means for connecting said neighborhood window registers to one input of said adder means;

means for applying a contribution value to the other input of said adder means;

zero detector means for detecting a zero output of said adder means; and maximum value detection means coupled to said adder means output for detecting the maximum value generated at said adder means output for the pixel values contained in said neighborhood window registers.

2. The improvement of claim 1 which further comprises:

multiplexer means having a plurality of inputs coupled to said neighborhood window registers, operative for sequentially coupling the pixel values contained in said registers to said one input of said adder means so as to provide pixel by pixel value analysis by said zero detector means and maximum value detection means coupled to the output of said adder means.

3. The improvement of claim 2 which further comprises:

means coupled to a multiplexer input associated with a particular neighborhood window register, operative to provide a correction value as a function of the pixel value contained in the center of said window; and means coupled to the output of said multiplexer for modifying each of said pixel values with said correction value before they are applied to said one input of said adder means.

4. The improvement of claim 2 which further comprises:

shift register means coupled to the output of said zero detector means, said shift register means having a plurality of bit locations, wherein said zero detector means loads said shift register so that the state of each bit location is representative of the output of said zero detector means for each pixel value within the neighborhood window.

5. The improvement of claim 4 wherein said shift register means is a serial-in-parallel-out shift register in which the parallel output provides address information for accessing a memory, said address being a function of the output of said zero detector means for a particular neighborhood window.

6. The improvement of claim 3 wherein said maximum value detection means comprises:

comparison means having first and second inputs, and a first output for providing an output signal when the value presented at said first input is greater than the value presented at said second input; and current maximum storage means having an input coupled to said comparison means first output for storing the current maximum pixel value as the pixels are sequentially presented to said adder means, said current maximum storage means having an output coupled to said second input of said comparison means so that said current maximum storage means provides a sequentially updated maximum value within the neighborhood window for comparison with subsequent pixel values.

7. The improvement of claim 6 which further comprises: subtraction means for deleting the correction value from the maximum pixel value within a given neighborhood window.

8. The improvement of claim 6 which further comprises:

a second output for said comparison means for providing an output signal when the value presented at the first comparison means input is greater than or equal to the value presented at said second input;

a shift register having loading input means for loading the register, a clear input for clearing the contents of the shift register and an output;

flip flop means coupled between the loading input means of said shift register and the second output of said comparison means; and means for coupling the first output of said comparison means to the clear input of said shift register whereby the state of the bit locations in said shift register pinpoints the location of pixels with the maximum value within the neighborhood windows.

9. The improvement of claim 8 which further comprises:

switching network means having inputs coupled to the output of said zero detector means, the first output of said comparison means, and the second output of said comparison means; said switching network means having a first output line coupled to said flip flop means and a second output line coupled to said clear input of the shift register; and means for selectively coupling the inputs of the switching network to its outputs depending upon the analysis to be carried out in that stage.

10. The improvement of claim 9 wherein said switching network couples the output of said zero detector means to the first output line of said switching network.

11. The improvement of claim 9 wherein said switching network couples the first output of said comparison means to said second output of the switching network and the second output of said comparison means to the first output of said switching network.

12. The improvement of claim 1 wherein said adder means is a binary adder device which includes a carry out output which generates a given value if the values at the inputs of said adder means causes same to generate a carry bit; and means for detecting the state of the carry out output of the adder means whereby pixel values within the window having a value greater than a given value may be detected.

13. The improvement of claim 12 which further comprises means for providing the two's complement of the given value as the contribution value to the adder means.

14. The improvement of claim 2 which further comprises:

means coupled to one of said multiplexer inputs for detecting the value of the center pixel in the window;

summation means coupled to the output of said multiplexer for combining indicia of the center cell pixel value with each pixel value in the window; and detector means coupled to the output of said summation means for detecting the state of the most significant bit of the combined value.

15. The improvement of claim 14 which further comprises:

shift register means having a plurality of bit locations corresponding to the pixel locations in the window; and means for loading said bit locations in the shift register with the output of the most significant bit detector for each pixel value.

16. The improvement of claim 1 wherein said system comprises a pipeline of substantially identical stages.

17. A method of performing a wide variety of image analyses in a neighborhood transformation stage, said method comprising:

accessing a group of neighboring pixels in a matrix thereof making up an image;

sequentially supplying each pixel in the group to one input of a logic circuit;

supplying a selected value to another input of the logic circuit;

causing the logic circuit to generate a given value associated with each pixel in the group as a function of said selected value;

temporarily storing the given values in a storage device until a given value for each pixel in the group has been generated; and using the contents of the storage device to generate a transformation value associated with each group of pixels, whereby the image analyses to be performed by the stage may be altered by changing the value of the selected value supplied to the logic circuit.

18. The method of claim 17 wherein said selected value is the two's complement of a particular pixel of interest.

19. The method of claim 17 which further comprises:
detecting the maximum value generated by the logic circuit for each group of pixels and storing said maximum value in said storage device.

20. The method of claim 17 wherein said logic circuit generates a carry out signal upon the addition of said selected value with certain pixel values;

and wherein the contents of said carry out signal is stored in the storage device.

21. The method of claim 17 which further comprises:
detecting the value of the center pixel in the group;
adding indicia of the center pixel value to each pixel value in the group;
detecting the state of the most significant bit of the summation; and
storing the state of the most significant bit in the storage device.

22. The method of claim 17 which further comprises:
connecting the transformation value to an input of a substantially identical stage in a pipeline.

* * * * *